(12) United States Patent
Covington et al.

(10) Patent No.: US 7,677,169 B2
(45) Date of Patent: Mar. 16, 2010

(54) APPARATUS AND METHOD USING IMAGING IN BUILDING A COTTON MODULE

(75) Inventors: Michael J. Covington, Germantown, TN (US); George H. Hale, Arlington, TN (US); Jimmy Ray Hargett, Bells, TN (US)

(73) Assignee: CNH America LLC, New Holland, PA (US)

(*) Notice: Subject to any disclaimer, the term of this patent is extended or adjusted under 35 U.S.C. 154(b) by 12 days.

(21) Appl. No.: 12/206,458

(22) Filed: Sep. 8, 2008

(65) Prior Publication Data

US 2009/0069986 A1    Mar. 12, 2009

Related U.S. Application Data

(60) Provisional application No. 60/967,621, filed on Sep. 6, 2007.

(51) Int. Cl.
*B30B 13/00* (2006.01)
*B30B 15/24* (2006.01)
*A01D 46/08* (2006.01)

(52) U.S. Cl. .............. 100/35; 100/46; 100/99; 100/146; 100/226; 56/10.2 R; 56/11.2; 56/28

(58) Field of Classification Search .......... 100/35, 100/46, 45, 99, 145, 146, 177, 178, 179, 100/226, 258 R, 258 A; 56/10.2 A, 10.2 R, 56/11.2, 28, 341
See application file for complete search history.

(56) References Cited

U.S. PATENT DOCUMENTS

| | | | |
|---|---|---|---|
| 3,908,540 A | 9/1975 | Broman | 100/215 |
| 4,519,193 A | 5/1985 | Yoshida et al. | 56/328 R |
| 4,660,469 A | 4/1987 | Smith et al. | 100/95 |
| 5,805,452 A | 9/1998 | Anthony et al. | 364/470.13 |
| 5,829,349 A * | 11/1998 | Fitzgerald et al. | 100/102 |
| 5,831,668 A | 11/1998 | Hirvonen et al. | 348/83 |
| 6,097,425 A | 8/2000 | Behnke et al. | 348/89 |
| 6,474,228 B1 | 11/2002 | Leupe et al. | 100/45 |
| 6,750,898 B1 | 6/2004 | Ishida et al. | 348/89 |
| 6,943,824 B2 | 9/2005 | Alexia et al. | 348/89 |
| 7,059,242 B2 | 6/2006 | Lemke et al. | 100/226 |
| 7,275,357 B2 | 10/2007 | Covington et al. | 56/28 |
| 7,320,208 B2 * | 1/2008 | Covington et al. | 56/28 |
| 7,404,355 B2 * | 7/2008 | Viaud et al. | 100/4 |
| 2006/0225397 A1 | 10/2006 | Dupire et al. | 56/341 |
| 2007/0175198 A1 | 8/2007 | Viaud et al. | 56/341 |
| 2007/0186530 A1 | 8/2007 | Meier et al. | 56/14.6 |
| 2007/0188605 A1 | 8/2007 | Anderson et al. | 348/89 |

* cited by examiner

*Primary Examiner*—Jimmy T Nguyen
(74) *Attorney, Agent, or Firm*—Michael G. Harms; John William Stader; Patrick M. Sheldrake

(57) ABSTRACT

A cotton module building apparatus, utilizing imaging apparatus operable for capturing real-time images of the module building process, including accumulated cotton in the module building chamber, cotton inflow, and the in-process cotton module, and a method for building a cotton module using the images. The imaging apparatus includes a camera or cameras disposed at advantageous locations about the module building chamber, and cotton is distributed and moved within the chamber responsive to the images, for advantageous placement and distribution for forming a module having a desired consistency and top shape. Imaging apparatus can also be provided for observing unloading of a module from the chamber, and for facilitating maneuvering and positioning the unloading apparatus.

28 Claims, 24 Drawing Sheets

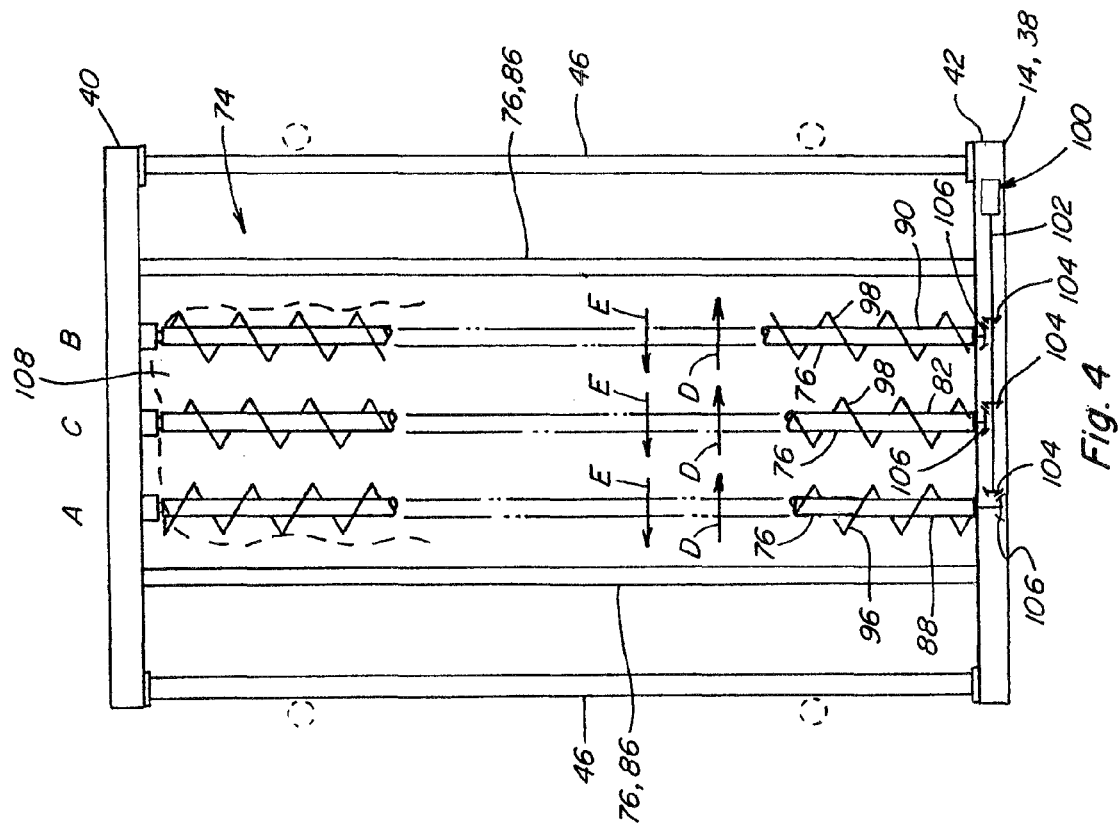
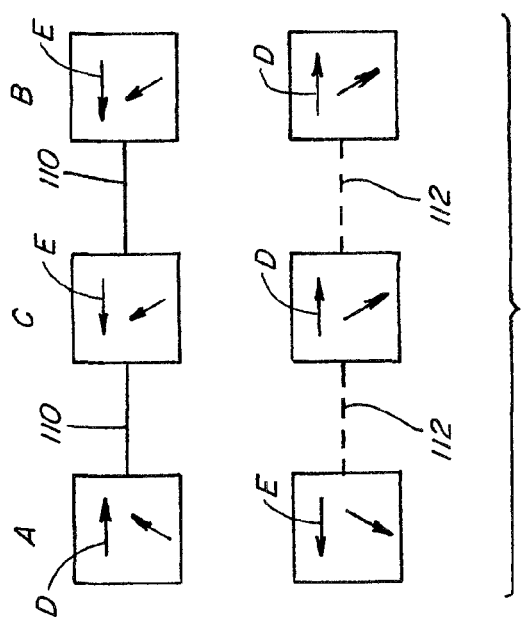

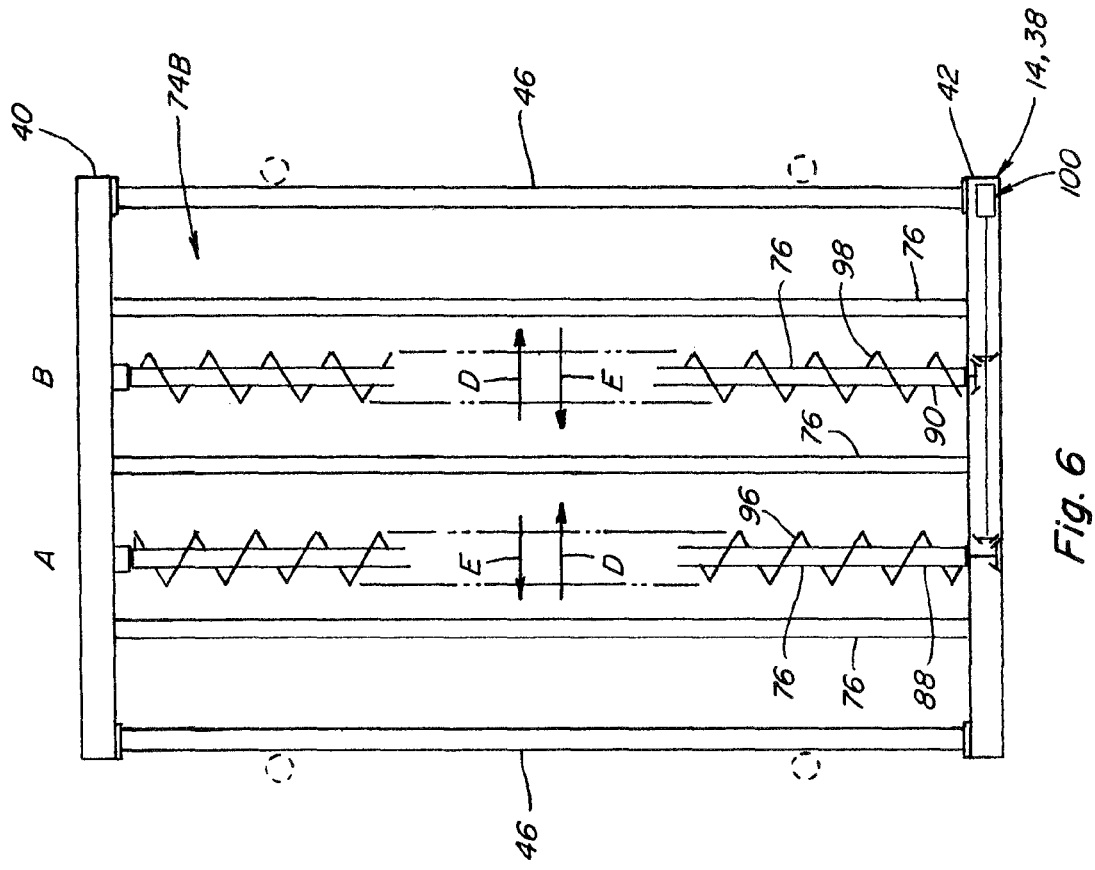
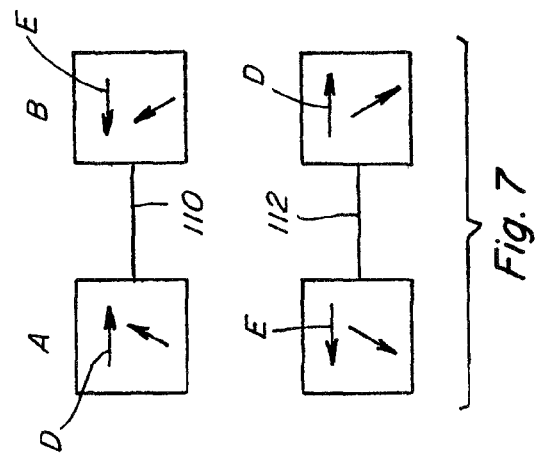
Fig. 6
Fig. 7

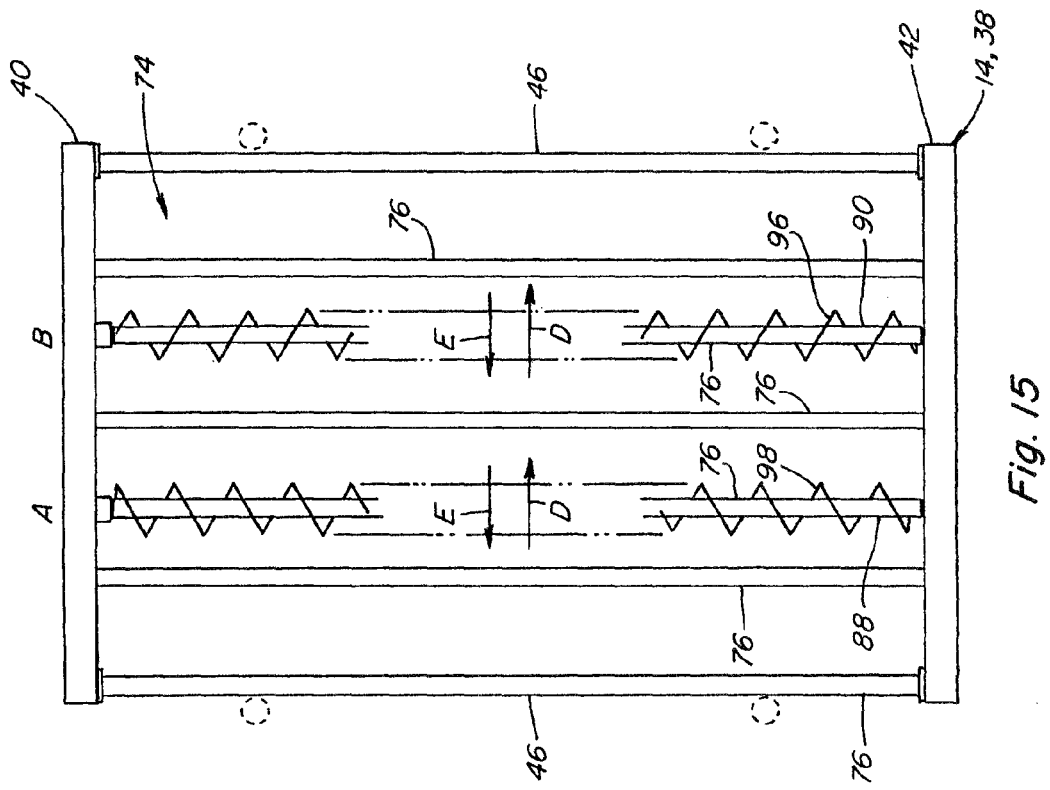
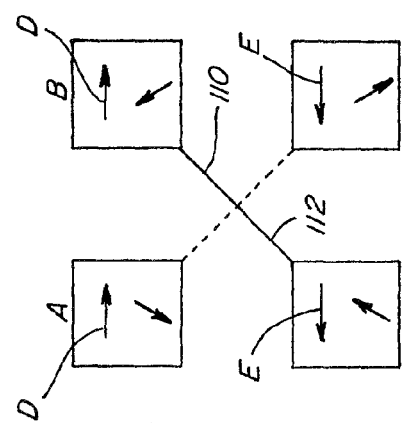

APPARATUS AND METHOD USING IMAGING IN BUILDING A COTTON MODULE

This application claims the benefit of U.S. Provisional Application No. 60/967,621, filed Sep. 6, 2007.

TECHNICAL FIELD

This invention relates generally to a cotton module building apparatus and method, and more particularly, utilizes imaging apparatus operable for capturing real time images of the module building process, including accumulated cotton in the module building chamber, cotton inflow, and the in-process cotton module, and a method for building a cotton module using the images. Imaging apparatus can also be provided for observing unloading of a module from the chamber, and for facilitating maneuvering and positioning the unloading apparatus.

BACKGROUND ART

U.S. Provisional Application No. 60/967,621, filed Sep. 6, 2007, is incorporated herein by reference in its entirety.

On a cotton harvester having an onboard cotton module builder, also known as a cotton packager, the module or cotton package is formed by a compactor apparatus or structure that moves in a vertical direction within a module builder or cotton compactor chamber, thereby pressing and compacting the cotton beneath the compactor structure against the chamber floor structure. Typically, augers on the compactor structure distribute the cotton within the compactor chamber and also act as compactor members for applying downward force against the cotton beneath the compactor structure when the compactor structure moves vertically down within the chamber. This results in a generally rectangular shape free-standing module of compacted cotton when subsequently unloaded onto the ground or another surface. Also typically, once unloaded, the top of the module is covered with a canvas or film tarp or cover. This is to prevent water from collecting on the module from rain or condensation prior to processing by a cotton gin. Cotton gins typically cannot process the cotton if the cotton is too high in moisture content. Recent advances in cotton compactor technology have provided the capability to densely pack the cotton, such that the module can substantially retain the shape of the sides of a module builder or compactor chamber, and such that the sides of the module will have a density that will shed water. However, to form a module having a desired consistency throughout, and/or a module top having a desired shape, for instance, a flat shape, a shape tapered or sloped to one side to shed water in one direction, or a crown shape to better shed water in all directions, it must be possible to controllably distribute the cotton in a manner which facilitates achieving such consistency and/or shape.

Self-propelled cotton harvesters equipped with on-board cotton module builders presently utilize an operator cab on the front of the harvester, separated from the cotton module builder by a row of ducts which extend upwardly from cotton harvesting row units located below and forwardly of the cab. These ducts greatly obstruct the view of the module builder from the cab, particularly the view into the module building chamber, such that, from the cab, the information regarding the status of conditions within the module building chamber, and particularly, regarding the shape of the upper surface of the presently formed module, and distribution of accumulated cotton, that can be obtained visually, is very limited. Additionally, in many instances, the module is being built as the harvester is harvesting cotton, such that it is not desirable or practical for the operator to attempt to directly visually observe the module building process.

To partially compensate for lack of visual information, it is known to provide apparatus and systems for sensing and gathering information regarding the module shape and cotton distribution. Reference in this regard, Lemke et al., U.S. Pat. No. 7,059,242, issued Jun. 13, 2006, and entitled Compactor Position Sensing for Module Builder. The information generated by systems such as that of the referenced Lemke et al. patent, is utilized in an automatic module building process and is useful, but it has been found that sometimes the automated system will fail to form a desired shape module top, e.g., tapered or crown shape, and that the inadequacies in respect to an individual cotton module may not be discovered until the module is unloaded. Thus, it is desirable to have a capability for ascertaining the status of the module top shape in-process, in real-time as the module is being built, and a capability to modify the module building process, as required for achieving desired module characteristics, particularly, as to the shape of the module top.

Compacting apparatus has also been developed which provides enhanced capability for module forming, particularly module top shape. Reference in this regard, Dupire et al., U.S. Patent Publication No. 20060225397, published Oct. 12, 2006, and entitled Cotton Compactor Apparatus with Right Hand and Left Hand Augers for a Cotton Module Builder and Method of Operation of the Same. This apparatus mostly provides satisfactory results. But still, there are times when it is desirable to adapt or modify the module building process, to achieve improved top shape and other characteristics. In this regard, the module building process is complex, and is controlled by a computer program with varying parameters to handle the different crop conditions that can be encountered not only from field to field but within the same field being harvested. These crop conditions include the yield (amount of cotton being harvested), variety of the cotton harvested, amount of moisture in the cotton, and trash content. The varying parameters of the program that operates the mechanism for forming the module takes these varying conditions into account. However, there are times when one or more of these parameters may need to be changed, enhanced or supplemented, such as the direction of auger rotation, number of compacting or packing cycles, e.g., adding an additional cycle or cycles, for achieving better module formation. It is been found that such parameter changes, supplements, etc., can be effected by operator inputs, from the operator cab during harvest, or by an operator controlling the module builder at another location, if the operator can visually observe how the module is being formed. Another visual help to the operator would be the ability to observe the unloading process of the module onto the ground or another surface.

Thus, what is sought is a manner of incorporating an imaging capability into a module builder and the module building process, which allows the operator to effectively monitor the module building process, and effect changes or modifications, on the go, from a remote location such as the operator cab and while simultaneously harvesting, which provides one or more of the desired capabilities, and overcomes one or more of the problems, set forth above.

SUMMARY OF THE INVENTION

What is disclosed is apparatus and a method of incorporating a real-time imaging capability into a cotton module builder and module building process, which allows the operator of the module builder to effectively monitor the module building process, and effect changes or modifications, in real time, on the go, from a remote location, such as the operator cab and while simultaneously harvesting, which provides one or more of the desired capabilities, and overcomes one or more of the problems, set forth above.

According to a preferred aspect of the invention, the method and apparatus enables viewing the module making process within the module forming chamber during harvest, and viewing the module unloading process, using one or more imaging devices which are small optical cameras located within or adjacent to the chamber for viewing module building and on the rear end of the harvester for viewing unloading. These cameras will feed a signal to a monitor screen within the operator cab. This enables the operator to view the process during harvest and immediately change parameters as needed for better module formation. Using more than one camera, located at different locations, is advantageous as it can give the operator different perspectives of the module being built, and also the accumulated cotton thereon, particularly, elevational perspectives which allow ascertaining what area or areas have the most accumulated cotton. This is in reference to front and rear directions, and also from side to side, which is particularly pertinent when the top of the module is to have a tapered or crown shape. The operator can also view the unloading process and make changes to the position of the unloading apparatus, unloading speed, and other parameters, as desired or required. Desirably, the viewing system will have the capability for changing the views displayed, and also for split screen viewing of more than one camera image at one time.

Exemplary camera locations according to the invention include a forward location within the chamber viewing rearwardly, and a rearward location therein viewing forwardly. A side location which provides a side perspective is also advantageous for quantitatively determining elevation and elevational differences at different locations within the chamber. It can also be useful for seeing between the auger flights, which may be more obstructive when viewed by cameras at forward and rear locations. Preferably, the camera or cameras within or adjacent to the chamber should be placed so as not to be significantly obstructed by the flow of incoming cotton, while still enabling viewing the compacting mechanism in its lowest position. Exemplary locations for the forwardly located camera include approximately between the middle and outer openings through which the cotton is received into the chamber, or below the center opening in the front chamber wall. This will provide a view of the cotton flowing inside the chamber to the rear, the rear of the compacting mechanism, and the rear portion of the cotton module underneath the compactor. A rear chamber camera could be placed opposite the front camera along the rear chamber wall, or on a side wall in the rear of the chamber. This will provide different perspectives of the front chamber openings and the cotton flow into the chamber, the front of the compacting mechanism, and the front portion of the cotton module beneath the compactor.

A rear unloading camera will preferably be mounted at the top outside on the rear of the module builder, so as to be capable of viewing any hazards or obstacles in the unloading path, the opening of the unloading doors, and the entire process of unloading the module onto the ground.

According to another preferred aspect of the invention, lighting can be provided within or adjacent to the chamber and directed rearwardly of the machine, and/or low light cameras may be used to improve visibility in poor lighting conditions.

According to still another preferred aspect of the invention, a method of forming a compacted cotton module involves alternating steps of distributing accumulated cotton within the module building chamber, and compacting the cotton, while visually monitoring the images of the process, in real-time, and modifying or adding steps to, the process as desired or required for achieving the module characteristics sought.

BRIEF DESCRIPTION OF THE DRAWINGS

FIG. 4 is a top view of the compactor apparatus of FIG. 1, showing one arrangement of right hand and left hand augers thereof;

FIG. 5 is a diagrammatic representation of operating modes of the augers of FIG. 4;

FIG. 6 is a top view of the compactor apparatus of FIG. 1, showing an alternative arrangement of right hand and left hand augers thereof;

FIG. 7 is a diagrammatic representation of operating modes of the augers of FIG. 6;

FIG. 15 is a top view of the compactor apparatus of FIG. 1, showing still another alternative arrangement of augers;

FIG. 16 is a diagrammatic representation of operating modes of the augers of FIG. 15;

DETAILED DESCRIPTION OF THE INVENTION

Figure 1:
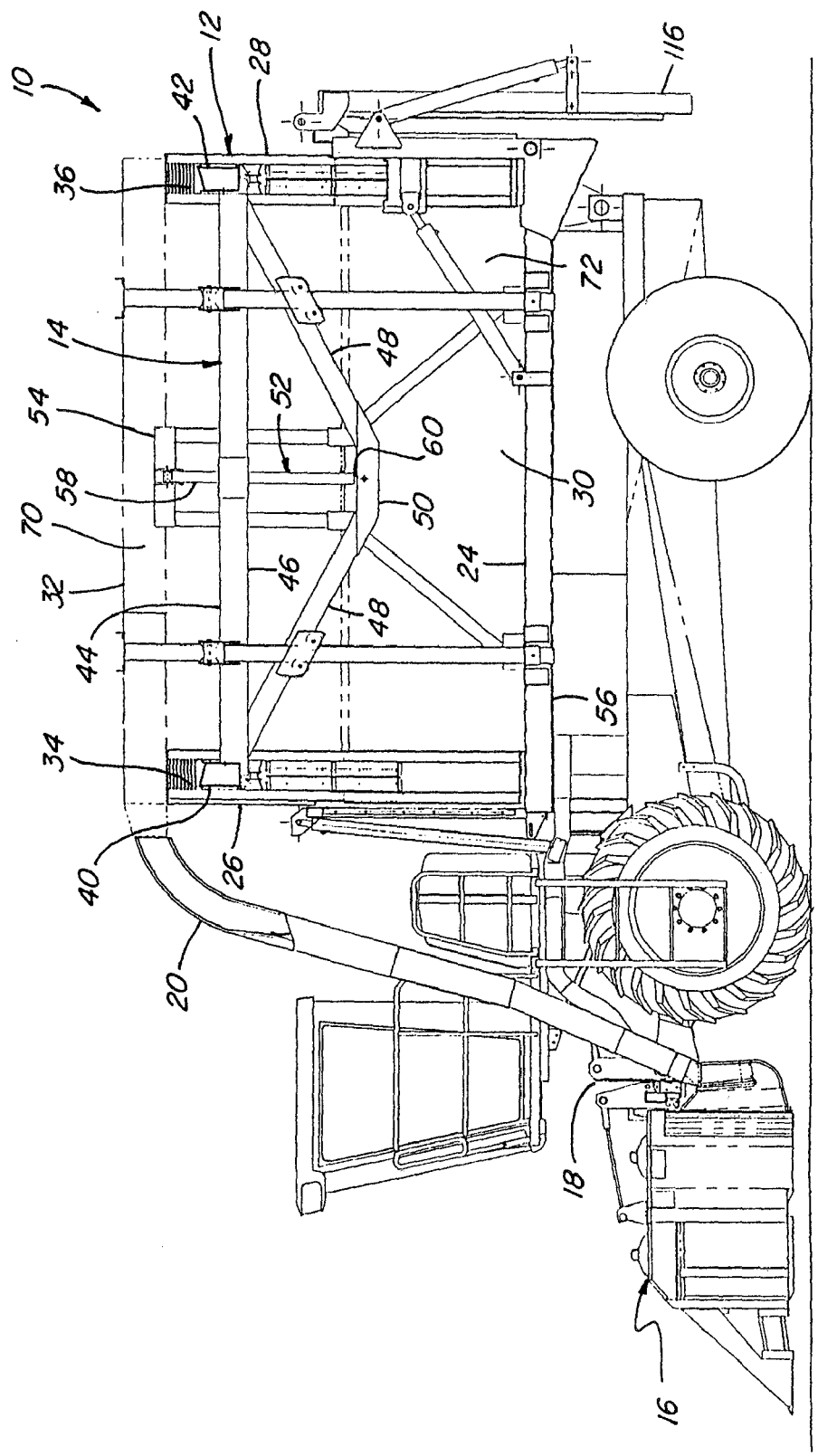
FIG. 1 is a side view of a cotton harvesting machine having an on-board cotton module builder including representative compactor apparatus for forming a compacted cotton module, the compactor apparatus being shown in a raised position.
Figure 2:
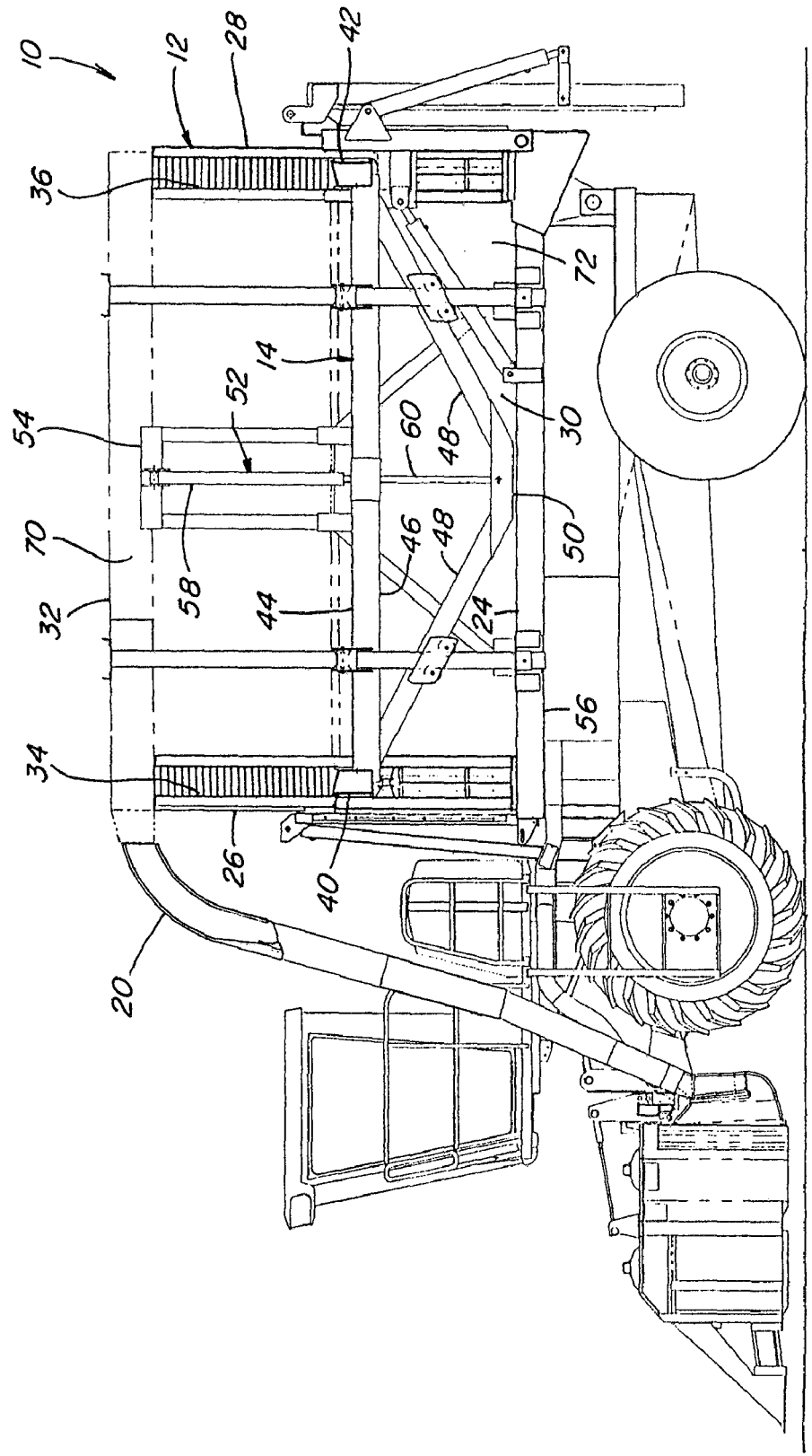
FIG. 2 is another side view of the harvesting machine of FIG. 1 showing the compactor apparatus in a lowered, compacting position.
Figure 3:
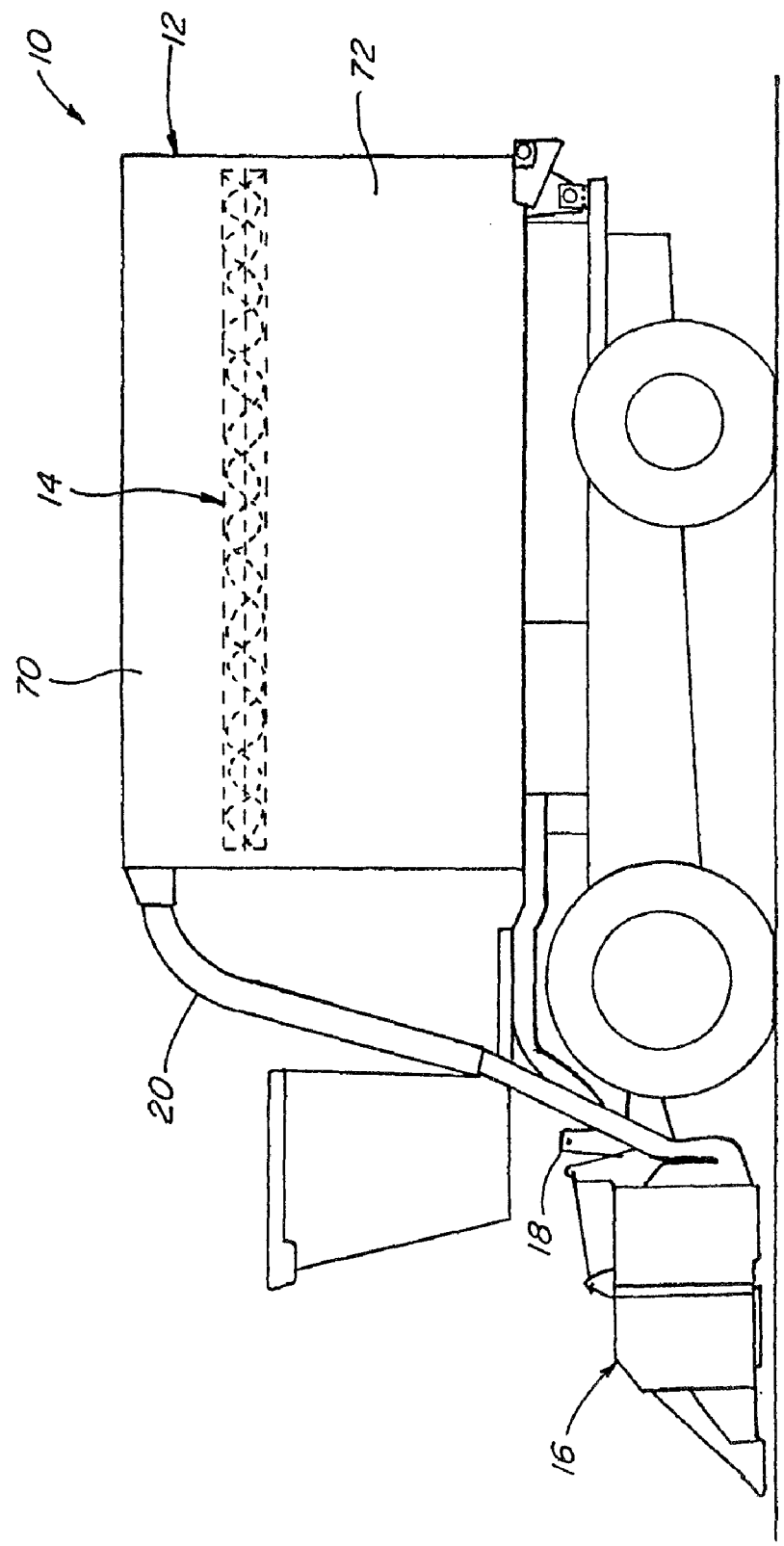
FIG. 3 is a simplified schematic side view of the harvesting machine showing the compactor apparatus in dotted lines and showing right hand and left hand augers thereof.

Referring now to the drawings, in FIGS. 1, 2 and 3, a representative cotton harvesting machine 10 is shown, including an on-board cotton module builder 12, including a compactor apparatus 14 representative of those operable according to preferred aspects of a method of the present invention for compacting and building a cotton module. Generally, cotton harvesting machine 10 is self-propelled for movement over a field of cotton plants, and includes a plurality of cotton harvesting units 16 extending in a side-by-side array across a front end 18 of machine 10. Cotton harvested by harvesting units 16 is conveyed by flows of air through ducts 20 which extend rearwardly and upwardly from harvesting units 16 to an upper region of a cotton compacting chamber 22 (FIGS. 9, 10 and 11) of module builder 12, in the well known conventional manner. The cotton conveyed into cotton compacting chamber 22 will then collect on a floor 24 within chamber 22, against which the cotton will be compacted by compactor apparatus 14, as will be explained.

Cotton compacting chamber 22 is a four-sided cavity defined on the bottom by floor 24 and upwardly extending opposing front and rear end walls 26 and 28, and opposing side walls 30, extending therebetween. Walls 26, 28 and 30 typically include openings or perforations therethrough, to allow passage and dissipation of the air used to convey the cotton into chamber 22, while retaining the cotton therein. The upper region of cotton compacting chamber 22 of module builder 12 is enclosed by a roof 32 which can also include openings or perforations for the passage of air but not significant amounts of cotton therethrough. The side walls 30 each include a vertical forward slot 34 adjacent front end wall 26, and a vertical rearward slot 36 adjacent rear end wall 28, slots 34 and 36 extending substantially the entire vertical height of the compacting chamber.

Compactor apparatus 14 of module builder 12 includes a compactor frame 38 which is generally horizontal and substantially entirely disposed within cotton compacting chamber 22, for movement downwardly against cotton contained therein for compacting the cotton against floor 24. Compactor frame 38 (FIGS. 4 and 6) includes a front cross member 40 disposed in chamber 22 adjacent front end wall 26, having opposite ends which extend through slots 34. Similarly, a rear cross member 42 is disposed in chamber 22 adjacent rear end wall 28 and has opposite ends extending through slots 36.

Compactor frame 38 of compactor apparatus 14 is supported in compacting chamber 22 on each side by an exterior side structure 44, each structure 44 including a substantially horizontal, forwardly and rearwardly extending main beam 46 which extends between and connects front and rear cross members 40 and 42. Each side structure 44 additionally includes a pair of braces 48 which extend downwardly and at converging angles from front and rear cross members 40 and 42, and which are connected together by a gusset 50 located spacedly below about the middle of main beam 46. Here, it should be noted that compactor frame 38 (FIG. 4) located within compacting chamber 22 and exterior side structures 44 on the exterior of the side walls represented by side wall 30 are movable upwardly and downwardly together.

The upward and downward movement of exterior side structures 44 and compactor frame 38 is preferably achieved and controlled by drivers 52 extending, respectively, between gusset 50 of each exterior side structure 44 and a support frame 54 supported by and extending upwardly from a frame 56 of module builder 12. Drivers 52 each preferably comprise a fluid cylinder 58 which receives fluid under pressure from a suitable pressurized fluid source, such as a fluid pump (not shown) of machine 10, for moving exterior side structure 44, and thus compactor frame 38 of compactor apparatus 14, upwardly and downwardly as required or desired for performing a cotton distributing and/or compacting operation. Each fluid cylinder 58 is connected to support frame 54 and includes a rod 60 connected to gusset 50 of exterior side structure 44. In FIG. 1, rod 60 is shown in a retracted position in cylinder 58 such that exterior side structure 44 and compactor frame 38 are located at an elevated or raised position. FIG. 2 shows rod 60 extended to a substantially extended position, to position side structure 44 and compactor frame 38 at a lowered position, representing about a maximum compacting position of compactor apparatus 14. Here, it should be noted that compactor apparatus 14 can be supported and driven by a wide variety of alternative apparatus other than that just disclosed, such as, but not limited to, apparatus including a greater or lesser number of drivers disposed in different positions in connection with the compactor structure. In regard to the next discussion, it should also be noted that the basic shape and/or dimensions of the cotton module builder or packager with which compactor structure is used can vary from that disclosed herein.

Generally, a cotton module built using module builder 12 will have a generally rectangular or four sided shape when viewed from above which will have a longitudinal extend of about 14 to 18 feet, a transverse extent of from about 6 to 9 feet, and a height of up to about 9 feet. The shape when viewed from above and the longitudinal and transverse dimensions of the module are determined by the corresponding dimensions of cotton compacting chamber 22. Preferably, the cotton modules, as represented by cotton module 62 shown in FIGS. 11 and 12, will have a top surface 64 having a crown 66 at about the center thereof, preferably extending longitudinally in the forward and rearward direction. Top surface 64 will slope downwardly from crown 66 to opposite longitudinally extending side peripheral edges 68 at an angle sufficiently steep such that the module, at least when covered with a fabric or film cover, will be capable of shedding moisture, such as rain water and dew. The height and shape of top surface 64 are preferably consistent from the forward to rearward end, and the sloped portions of top surface 64 can be curved or straight.

As noted above, during the harvesting operation, cotton is conveyed by air flows through ducts 20 into chamber 22. The cotton is discharged into an upper region 70 of chamber 22, above compactor apparatus 14. The cotton must then pass or be conveyed downwardly through compactor apparatus 14 into the lower region 72 of chamber 22, below compactor apparatus 14. Additionally, initially the cotton may not be evenly distributed either forwardly and rearwardly or side to side within upper region 70, and the amount and density of the cotton within region 70 can vary widely, depending on such factors as harvesting rate and the amount of compacting actions done by compactor apparatus 14 within chamber 22. In the former regard, with the advent of six row cotton harvesters, the rate of cotton inflow into upper region 70, particularly under high yield conditions, can be quite high, sufficient for cotton to collect to a significant height above compactor apparatus 14, particularly the rear end, within a relatively short period of time. Augers are provided on compactor apparatus 14, for distributing and transferring this cotton in a desired manner to lower region 72. In the latter regard, the functions of compactor apparatus 14 include activating the augers for distributing the cotton more evenly or as desired within lower region 72, and at times driving compactor apparatus 14 downwardly against the cotton to compress and compact it within lower region 72 and against floor 24, typically with the augers not rotating. Thus, compactor apparatus 14 functions to transfer or convey the cotton from upper region 70 to lower region 72; to distribute the cotton more evenly or in a desired manner within lower region 72; and to compact the cotton in lower region 72 into the compacted cotton module as represented by module 62, including, in this embodiment, so as to have a top surface 64 including a crown 66 extending the length of the middle thereof.

Figure 9:
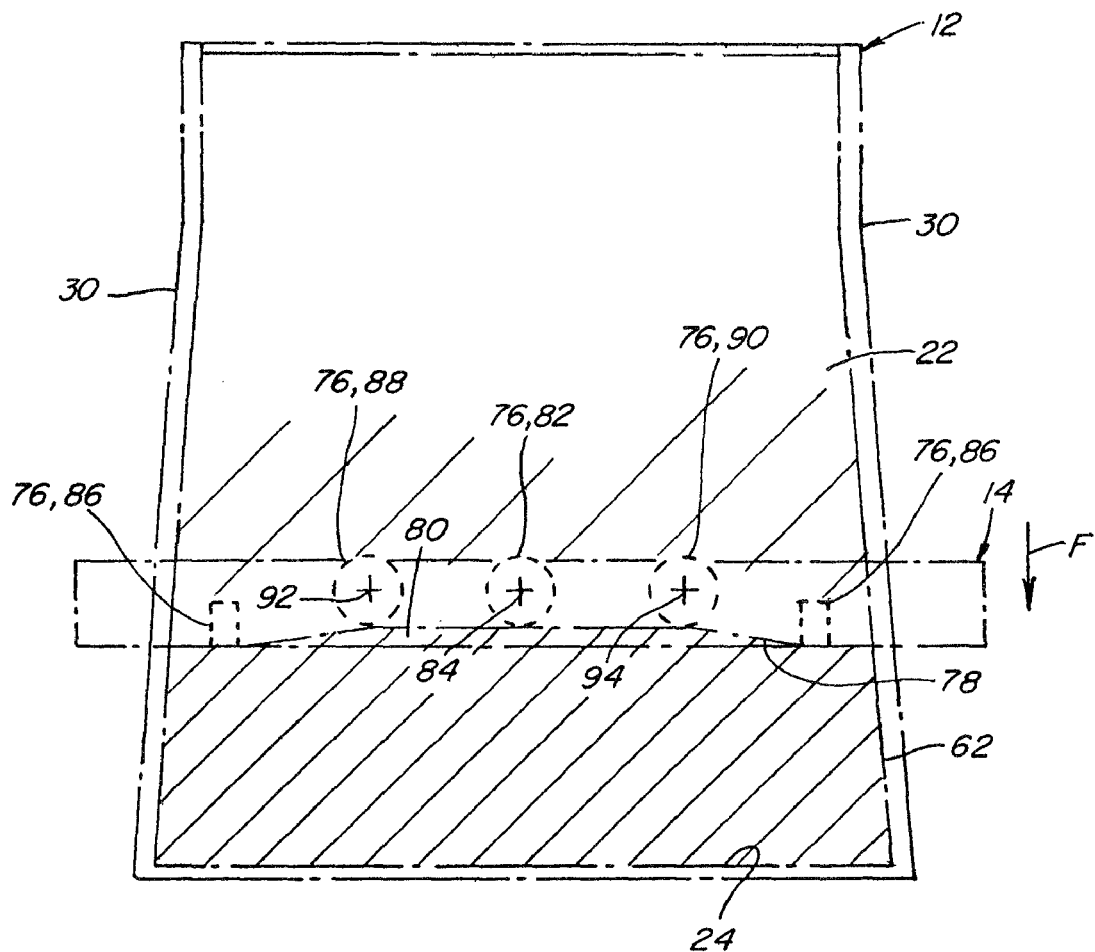
FIG. 9 is a simplified schematic end view of the cotton module builder of FIG. 1, showing the compactor apparatus in a lowered position compacting cotton in a bottom region of the module builder.
Figure 10:
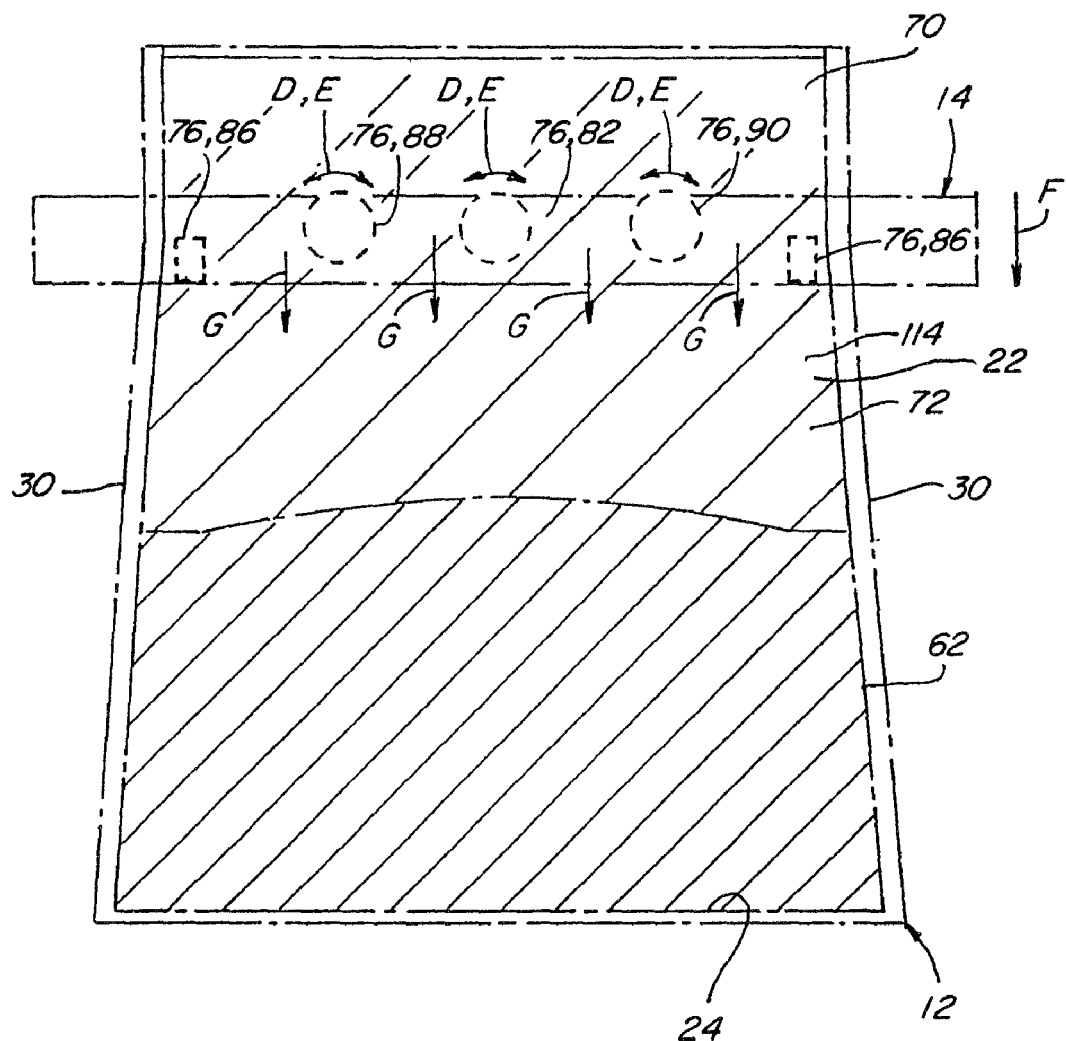
FIG. 10 is another simplified schematic end view of the cotton module builder of FIG. 1, showing the compactor apparatus in an uppermost position, and illustrating rotation of augers thereof for distributing cotton within the module builder.
Figure 11:
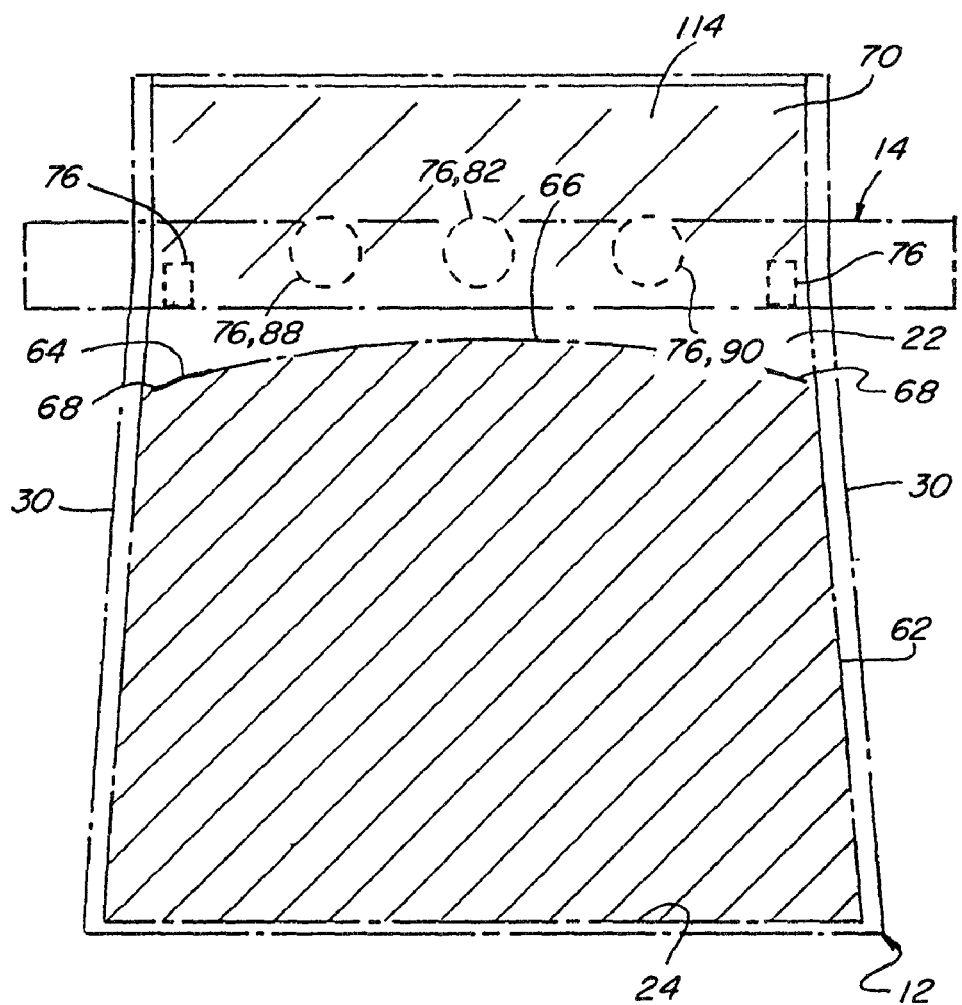
FIG. 11 is another simplified schematic end view of the cotton module builder of FIG. 1, showing the compactor apparatus in the uppermost position holding cotton above a completed cotton module.

Referring also to FIGS. 4 and 5, construction and operation of one embodiment of a compactor apparatus 14 including three augers is shown including features for performing the functions set forth above. FIGS. 6 and 7 illustrate construction and operation of an alternative two auger embodiment of compactor apparatus 14. Each of the embodiments of compactor apparatus 14 includes a plurality or array 74 of elongate cotton compactor members 76 extending between front cross member 40 and rear cross member 42 at spaced locations between main beams 46. The compactor members 76 of array 74 each include a lower cotton contacting portion for pressing against the cotton in lower region 72 for compacting it when apparatus 14 is driven downwardly by drivers 52 thereagainst. Referring also to FIGS. 9, 10 and 11, the cotton compactor members 76 located between side beams 86 are preferably disposed above side beams 86, to define a longitudinally extending, downwardly facing cavity 80 represented by line 78, for forming crown 66 and the sloped shape on top surface 64 of a cotton module 62 as it is being compacted, as will be explained.

In FIGS. 4, 9, 10 and 11, array 74 of compactor members 76 includes a centrally located longitudinally extending center auger 82 rotatable about an axis of rotation 84 (FIG. 9) extending longitudinally therethrough; opposite side compactor members 76 which comprise longitudinally extending beams 86; and longitudinally extending augers 88 and 90 disposed between center auger 82 and beams 86, and rotatable about rotational axes 92 and 94 (FIG. 9), respectively. Center auger 82 and auger 90 are each right hand augers, that is, they each include a right hand helical flight 98 therearound, and auger 88 is a left hand auger, including a left hand helical flight 96 therearound. Alternatively, for this embodiment, auger 82 could be a left hand auger, if desired. In FIG. 4, auger 88 is also denoted as auger A; auger 90 is denoted as auger B; and auger 82 is denoted as auger C.

Augers 82, 88 and 90 are rotatable by a suitable drive 100, which is illustrated as a gear drive including a drive motor, which can be, for instance, an electric or fluid motor, controllable for rotating an output 102 extending through rear cross member 42 and including bevel gears 104 enmeshed with bevel gears 106 on augers 82, 88 and 90, respectively, for effecting rotation thereof. Alternatively, drive 100 can include an individual drive for each of augers 82, 88 and 90, or, a common drive for right hand augers 82 and 90, and a separate drive for left hand auger 88, as well as other drive arrangements, as desired or required for a particular application. Here, it should be noted that for versatility, and to facilitate a wide range of options for forming a cotton module, each of augers 82, 88 and 90 is desirably rotatable in both a clockwise rotational direction, denoted by arrows D, and a counterclockwise rotational direction, denoted by arrows E. In this regard, by using a common drive, such as drive 100 illustrated, augers 82, 88 and 90 can be rotated simultaneously, with left hand auger 88 being counter-rotated relative to right hand augers 82 and 90. That is, when output 102 is rotated to rotate right hand augers 82 and 90 in clockwise direction D, because of reverse gearing, left hand auger 88 is rotated in counterclockwise direction E. Conversely, when output 102 is rotated for rotating right hand augers 82 and 90 in counterclockwise direction E, auger 88 will be simultaneously rotated in clockwise direction D. It should be noted that FIG. 4 is a top view, looking down on augers 82, 88 and 90, front cross member 40 and thus the front end of compactor apparatus 14 being located at the top of the figure. Additionally, it should be noted that when left hand augers 88 is rotated in clockwise direction D, it will act to pitch or push or convey cotton thereabove and thereon toward the front end of compactor apparatus 14, that is, toward front cross member 40 at the top of FIG. 4, and also to the right. When rotated in direction E, augers 82 and 90 will have a tendency to push the cotton thereabove toward front cross member 40, and at least to some extent, to the left as viewed from above in FIG. 4. When left hand auger 88 is rotated in the counterclockwise direction E, it will convey or push cotton thereon toward the rear and, at least to some extent, to the left. When right hand augers 82 and 90 are rotated in direction D, they will convey cotton thereon to the rear and to the right. In this way, it should be apparent that by the combination of left hand auger 88 and right hand augers 82 and 90, and counter-rotating those opposite hand augers in directions D and E, respectively, collected cotton on and above the augers can be conveyed thereby forwardly and downwardly therethrough to a central, front region of compacting chamber 22, as generally denoted by region 108. This is advantageous, as cotton conveyed through ducts 20 into upper region 70 of chamber 22 of module builder 12, will be typically initially directed more toward the mid and rear portions of upper region 70, and it is anticipated that most of the cotton will therefore desirably be conveyed by augers 82, 88 and 90 into a more mid or rear portion of lower region 72. As a result, for forming a cotton module which is generally uniform front to rear, it will thus be desirable to convey a portion of that cotton forwardly toward region 108.

FIG. 5 is a diagrammatic representation of a matrix of possible directions of rotation of augers 88, 90 and 82, denoted as A, B and C, respectively, and the effective direction of movement of cotton thereon thereby. Arrow D or E in each of the boxes denotes the direction of rotation of the auger, and the diagonal arrow in the box below the arrow D or E denotes the direction in which the cotton on and above the auger will be moved or conveyed thereby. Thus, it can be seen that simultaneous rotation of augers A and B/C in directions D and E, respectively, will result in conveyance of cotton thereon and thereabove generally toward the center and front, that is, toward region 108 in FIG. 4, whereas rotation of those augers in the opposite direction E will convey the cotton thereon more outwardly and rearwardly. The boxes for conveyance of the cotton more forwardly are connected by solid line 110. The boxes for conveyance of the cotton more rearwardly are connected by dotted lines 112. Generally, for building a cotton module having a crown on the top, it is anticipated that it will be desirable to operate the augers mostly in the combination connected by lines 110.

In the embodiment of FIG. 6, array 74 of compactor members includes only augers 88 and 90. Center auger 82 is replaced by a center compactor member 76. Auger 88 again is a left hand auger, that is, it includes a left hand helical flight 96 therearound, and auger 90 is a right hand auger, including a right hand helical flight 98 therearound. Auger 88 is also denoted as auger A and auger 90 is denoted as auger B.

Figure 8:
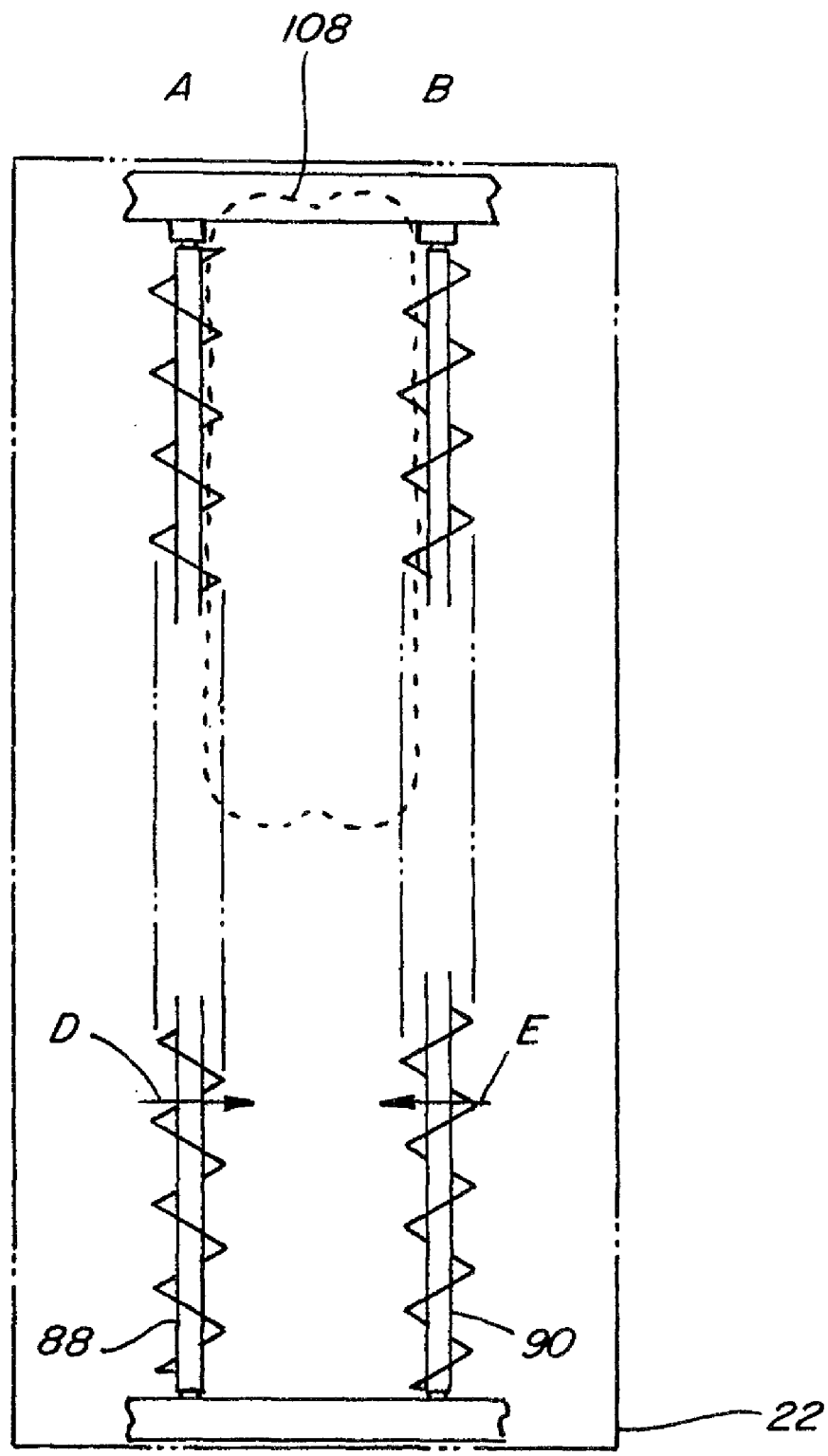
FIG. 8 is a simplified schematic top view of the compactor apparatus of FIG. 6, illustrating a manner of compaction of cotton thereby.

Augers 88 and 90 are counter-rotatable by a suitable common drive such as drive 100 shown, or can be driven by individual drives, as desired or required for a particular application. Here, it should be again noted that for versatility, and to facilitate a wide range of options for forming a cotton module, each of augers 88 and 90 is desirably rotatable in both a clockwise rotational direction, denoted by arrows D, and a counterclockwise rotational direction, denoted by arrows E. Also again, as in FIG. 4, it should be noted that FIG. 6 is a top view, looking down on augers 88 and 90, front cross member 40 and thus the front end of compactor apparatus 14 being located at the top of the figure. Additionally, it should be noted that when left hand auger 88 is rotated in clockwise direction D, it will act to push or convey cotton thereon and thereabove toward the front end of compactor apparatus 14, that is, toward front cross member 40 at the top of FIG. 4. Depending on the angle or pitch of helical flights 96 of auger 88 relative to the longitudinal direction, when rotated in direction D, auger 88 will have a tendency to push the cotton thereon, at least to some extent, to the right as viewed from above. Simultaneously, right hand auger 90 will be rotated in the counterclockwise direction E so as to convey or push cotton thereon toward the front and, at least to some extent, to the left, depending on the pitch or angle of right hand helical flight 98. In this way, it should be apparent that by the combination of left hand augers flights 96 on auger 88, right hand auger flights 98 on auger 90, and counter-rotating those opposite hand augers in directions D and E, respectively, collected cotton on compactor apparatus 14 can be conveyed thereby to a central, front region of compacting chamber 22, as generally denoted by region 108 in FIG. 8, and as is advantageous as discussed above for forming a module having a crown.

FIG. 7 is a diagrammatic representation of a matrix of possible directions of rotation of augers 88 and 90 of the embodiment of FIG. 6, denoted as A and B, respectively. Again, arrow D or E in each of the boxes denotes the direction of rotation of the auger, and the diagonal arrow in the box below the arrow D or E denotes the direction in which the cotton on the auger will be conveyed thereby. Thus, it can be seen that simultaneous counter-rotation of augers A and B in directions D and E, respectively, will result in conveyance of cotton thereon generally toward the center and front, that is, toward region 108 in FIG. 8, whereas counter-rotation of those augers in the opposite directions E and D, respectively, will convey the cotton thereon more outwardly and rearwardly. The boxes for conveyance of the cotton more forwardly are connected by solid line 110. The boxes for conveyance of the cotton more rearwardly are connected by dotted line 112. Again, it is anticipated that the operating combination of line 110 would be mostly used for forming a module having a crown top.

Referring also to FIGS. 9, 10, and 11, steps for building a compacted cotton module, represented by module 62, and including a crown 66 extending longitudinally along about the center of a top surface 64, will be described. In FIG. 9, compactor apparatus 14 is shown at a lowered compacting position within cotton compacting chamber 22 of compactor apparatus 14 for compacting the cotton against floor 24 and side walls 30 of module builder 12. Here, it should be understood that compactor apparatus 14 can be lowered by drivers 52 (FIGS. 1 and 2) so as to contact and exert a force, denoted by arrow F, against the cotton collected on floor 24 sufficient for significantly compacting the cotton. The augers 82, 88 and 90, will typically not be rotated during this compaction step. Due to the existence of concave cavity 80, the desired top surface 64 having a longitudinally extending, central crown 66 and downward slopes to side beams 86, will be formed. Here, it should be noted that these steps can be repeated as desired or required at different elevations within chamber 22 as incoming cotton is incorporated and formed into module 62.

In FIG. 10, partially completed module 62 is located in the lower region of chamber 22 and compactor apparatus 14 is located a spaced distance thereabove, with augers 82, 88 and 90 being rotated, as denoted by arrows D and E, for transferring and distributing loose and incoming cotton 114 (represented by wider cross hatched region) from upper region 70 of chamber 22 downwardly between augers 82, 88 and 90 and beams 86 into lower region 72, denoted by arrows G, over and onto partially formed module 62 (narrower cross hatched) for integration into module 62, when compactor apparatus 14 is driven downwardly, as denoted by arrow F (see FIG. 9).

Referring also to FIG. 11, compactor apparatus 14 is shown in a raised position above a completed compacted cotton module 62, module 62 including a top surface 64 having a center crown 66 and a shape which slopes downwardly therefrom toward peripheral edges 68, along the longitudinal extent of module 62. Loose and incoming cotton 114 (represented by wider cross hatching) is located and accumulating in upper region 70 of chamber 22. By not rotating augers 82, 88 and 90, at least a substantial portion of the incoming cotton will be retained in upper regions 70, to allow unloading of the completed cotton module 62, as shown in FIG. 12.

Here, it should be noted that during the harvesting operation, as cotton is delivered into upper region 70, the augers can be continuously operating, so as to continuously convey and distribute the cotton into the lower region of the chamber and such that the cotton will not collect to a significant extent in the upper region. During such auger operation, the speed and direction of rotation can be varied or alternated as desired or required for obtaining a desired distribution of the cotton in the lower region of the chamber. Then, at times, as required, the compactor apparatus can be lowered with the augers rotating to distribute the collected cotton in a desired or required manner, and the rotation can be stopped as the compactor apparatus is driven downwardly against the cotton to compact it.

Figure 12:
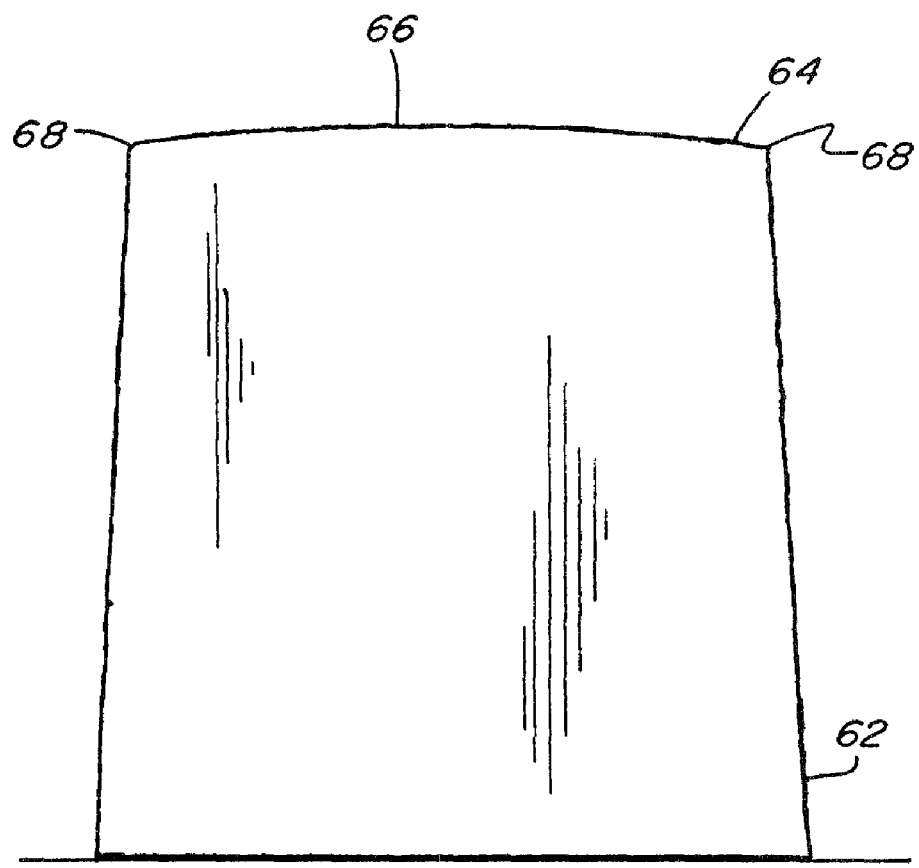
FIG. 12 is an end view of a free standing cotton module built in the module builder of FIG. 1.

Referring also to FIG. 12, completed cotton module 62 is shown removed from chamber 22, the module having been compacted sufficiently so as to be freestanding, and so as to retain top surface 64 having centrally located longitudinally extending crown 66, and slopes extending downwardly to peripheral edges 68. Module 62 will be sufficiently densely compacted and the crown and slope will be such that moisture will not accumulate thereon. Module 62 is now ready to be covered.

Here, in reference to FIGS. 9, 10 and 11, cotton module builder 12 can have longitudinally extending opposite side walls 30 which extend divergingly in the downward direction, such that a completed cotton module such as module 62 will have correspondingly tapered side walls. It should also be noted that side beams 86 of compactor apparatus 14 are positioned so as to be in close proximity to the side walls, respectively, when module 62 is at and near its complete or maximum height, as best shown in FIGS. 10 and 11, such that the cotton will be compacted and shaped between the side walls and beams to form the longitudinally extending side peripheral edges 68 lower than crown 66. It should be further noted that it is anticipated that a completed cotton module will be unloaded from module builder 12 by tilting module builder 12 such that the forward end thereof is raised relative to the rearward end, and that the module will be conveyed over a folding door apparatus 116 (FIG. 1). As a result, it is desirable to retain cotton within upper region 70, with only a minimal amount of the cotton inadvertently being allowed to pass or fall downwardly through compactor apparatus 14 onto the completed module, or into the empty chamber so as to possibly fall or pass from the chamber. Thus, in regard to the spacing between the compactor members of compactor apparatus 14, such spacing should be sufficiently adequate for passage of cotton therethrough when the augers are rotating, but sufficiently small such that cotton can be largely retained by the augers thereabove after completion of a cotton module. As a result, less cotton will be likely to be lost and only a small amount of loose cotton will be present on the top of the module, such that a cover placed on the module will fit snugly in conformance to the top surface and have few depressions or irregularities where moisture can collect. Because the size and shape of the top surface of the module can be closely controlled as a result of the present invention, covers can be more precisely made to the same size and shape, such that there is less likelihood of wind getting under a loose cover and lifting and fully or partially removing it or damaging it or the underlying cotton.

Alternatively, it should be recognized that the auger arrangement of compactor apparatus 14 can be configured for better distributing cotton therebeneath, that is, the cotton already in lower region 72, as opposed to the cotton thereabove. Two preferred embodiments of auger arrangements for better distributing cotton beneath compactor apparatus 14 are discussed hereinbelow.

Figure 13:
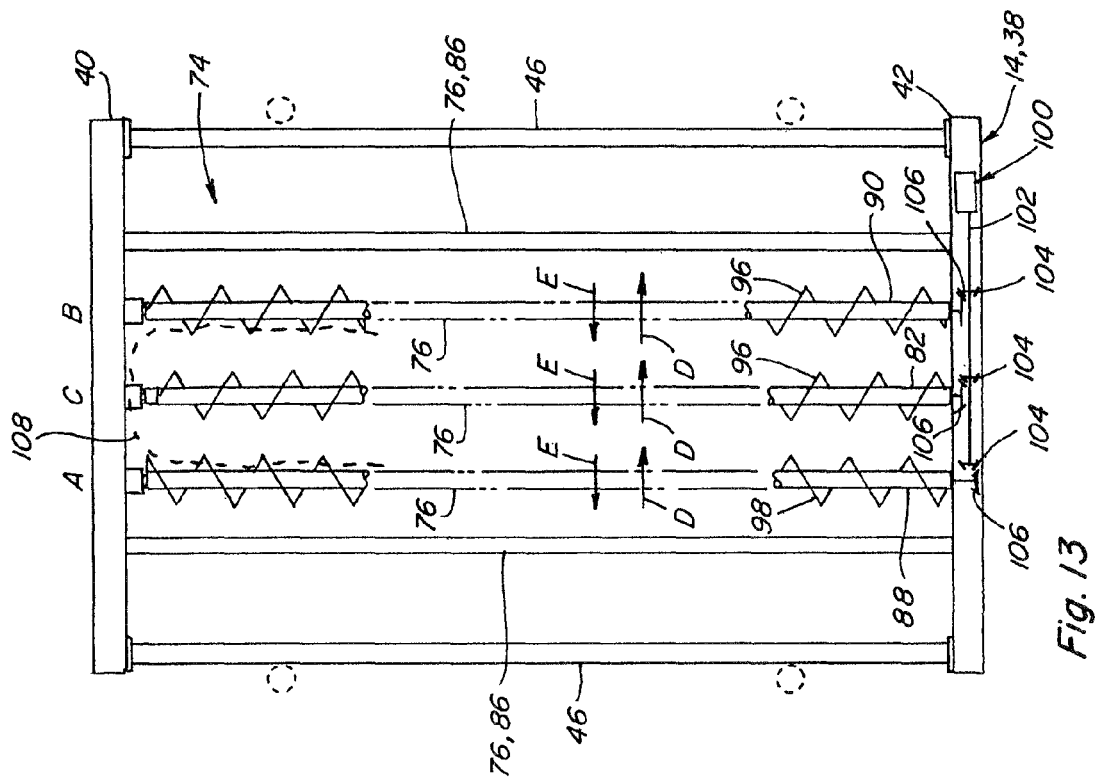
FIG. 13 is a top view of the compactor apparatus of FIG. 1, showing another arrangement of right hand and left hand augers.
Figure 14:
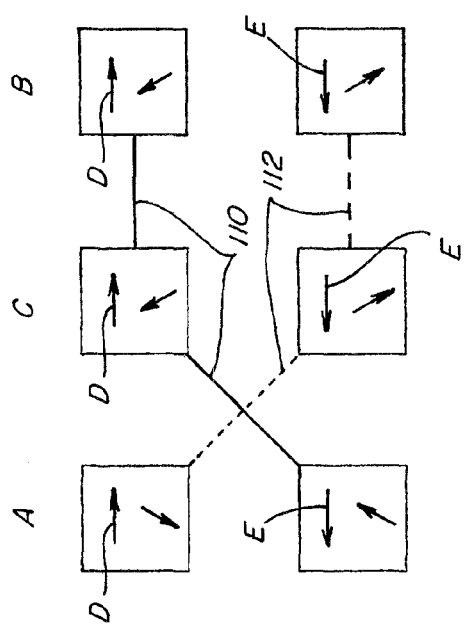
FIG. 14 is a diagrammatic representation of operating modes of the augers of FIG. 13.

Referring also to FIGS. 13 and 14, construction and operation of another embodiment of a compactor apparatus 14 is shown. FIGS. 15 and 16 illustrate construction and operation of still another alternative embodiment of compactor apparatus 14. Each of the embodiments of compactor apparatus 14 includes a plurality or array 74 of elongate cotton compactor members 76 extending between front cross member 40 and rear cross member 42 at spaced locations between main beams 46. The compactor members 76 of array 74 each include a lower cotton contacting portion for pressing against the cotton in lower region 72 for compacting it when apparatus 14 is driven downwardly by drivers 52 thereagainst.

In FIG. 13, array 74 of compactor members 76 includes a centrally located longitudinally extending center auger 82 rotatable about an axis of rotation extending longitudinally therethrough; opposite side compactor members 76 which comprise longitudinally extending beams 86; and longitudinally extending augers 88 and 90 disposed both horizontally and vertically between center auger 82 and beams 86, and rotatable about longitudinal rotational axes therethrough. Center auger 82 and auger 90 are each left hand augers, that is, they each include a left hand helical flight 96 therearound, and auger 88 is a right hand auger, including a right hand helical flight 98 therearound. This is the opposite of the arrangement of FIG. 4. In FIG. 13, auger 88 is also denoted as auger A; auger 90 is denoted as auger B; and auger 82 is denoted as auger C.

Augers 82, 88 and 90 are rotatable by a suitable drive 100, which again is illustrated as a gear drive including a drive motor, which can be, for instance, an electric or fluid motor, controllable for rotating an output 102 extending through rear cross member 42 and including bevel gears 104 enmeshed with bevel gears 106 on augers 82, 88 and 90, respectively, for effecting rotation thereof. Alternatively, drive 100 can include an individual drive for each of augers 82, 88 and 90, or, a common drive for left hand augers 82 and 90, and a separate drive for right hand auger 88, as well as other drive arrangements, as desired or required for a particular application. Here, it should be noted that for versatility, and to facilitate a wide range of options for forming a cotton module, each of augers 82, 88 and 90 is desirably rotatable in both a clockwise rotational direction, denoted by arrows D, and a counterclockwise rotational direction, denoted by arrows E. In this regard, by using a common drive, such as drive 100 illustrated, augers 82, 88 and 90 can be rotated simultaneously, with right hand auger 88 being counter-rotated relative to left hand augers 82 and 90. That is, when output 102 is rotated to rotate right hand auger 88 in clockwise direction D, because of reverse gearing, left hand augers 82 and 90 are rotated in counterclockwise direction E. Conversely, when output 102 is rotated for rotating auger 88 in counterclockwise direction E, augers 82 and 90 will be simultaneously rotated in clockwise direction. It should be noted that FIG. 13 is a top view, looking down on augers 82, 88 and 90, front cross member 40 and thus the front end of compactor apparatus 14 being located at the top of the figure. Additionally, it should be noted that when left hand augers 82 and 90 are rotated in clockwise direction D, they will act to push or convey cotton therebeneath toward the front end of compactor apparatus 14, that is, toward front cross member 40 at the top of FIG. 13. Depending on the angle or pitch of helical flights 96 of augers 82 and 90 relative to the longitudinal direction, when rotated in direction D, augers 82 and 90 will have a tendency to push the cotton therebeneath, at least to some extent, to the left as viewed from above in FIG. 13. Simultaneously, right hand auger 88 will be rotated in the counterclockwise direction E so as to convey or push cotton therebeneath toward the front and, at least to some extent, to the right, depending on the pitch or angle of right hand helical flights 98. In this way, it should be apparent that by the combination of left hand augers flights 96 on auger 88, right hand auger flights 98 on augers 82 and 90, and counter-rotating those opposite hand augers in directions D and E, respectively, collected cotton beneath compactor apparatus 14 can be conveyed thereby to a central, front region of compacting chamber 22, as generally denoted by region 108. This is advantageous, as cotton conveyed through ducts 20 into upper region 70 of chamber 22 of module builder 12 (FIGS. 1 and 2), will be typically initially directed more toward the mid and rear portions of upper region 70, and it is anticipated that most of the cotton will therefore fall and be conveyed by augers 82, 88 and 90 into a more mid or rear portion of lower region 72. As a result, for forming a cotton module which is generally uniform front to rear, it will thus be desirable to convey a portion of that cotton forwardly toward region 108. This may be done at different elevations in chamber 22, and/or with apparatus 14 in its raised position, as desired or required for achieving a desired distribution of the cotton in chamber 22. For instance, the augers could be operated when apparatus is in a position such as shown in FIG. 9, or any position between that of FIG. 9 and that of FIG. 11.

FIG. 14 is a diagrammatic representation of a matrix of possible directions of rotation of augers 88, 90 and 92, denoted as A, B and C, respectively, and the effective direction of cotton movement thereby. Arrow D or E in each of the boxes denotes the direction of rotation of the auger, and the diagonal arrow in the box below the arrow D or E denotes the direction in which the cotton beneath the auger will be moved or conveyed thereby. Thus, it can be seen that simultaneous counter-rotation of augers A and B/C in directions E and D, respectively, will result in conveyance of cotton therebeneath generally toward the center and front, that is, toward region 108 in FIG. 13, whereas counter-rotation of those augers in the opposite directions, D and E, respectively, will convey the cotton therebeneath more outwardly and rearwardly. The boxes for conveyance of the cotton more forwardly are connected by solid line 110. The boxes for conveyance of the cotton more rearwardly are connected by dotted line 112. Generally, for building a cotton module having a crown on the top, it is anticipated that it will be desirable to operate the augers mostly in the combination connected by line 110.

In the embodiment of FIG. 15, array 74 of compactor members includes only augers 88 and 90. Center auger 82 is replaced by a center compactor member 76. As in the embodiment of FIG. 13, auger 88 again is a right hand auger, that is, it includes a right hand helical flight 98 therearound, and auger 90 is a left hand auger, including a left hand helical flight 96 therearound. Auger 88 is also denoted as auger A and auger 90 is denoted as auger B.

Augers 88 and 90 are counter-rotatable by a suitable common drive such as drive 100 shown in FIG. 13, or can be driven by individual drives, as desired or required for a particular application. Here, it should be again noted that for versatility, and to facilitate a wide range of options for forming a cotton module, each of augers 88 and 90 is desirably rotatable in both a clockwise rotational direction, denoted by arrows D, and a counterclockwise rotational direction, denoted by arrows E. Also again, as in FIG. 13, it should be noted that FIG. 15 is a top view, looking down on augers 88 and 90, front cross member 40 and thus the front end of compactor apparatus 14 being located at the top of the figure. Additionally, it should be noted that when left hand auger 90 is rotated in clockwise direction D, it will act to push or convey cotton therebeneath toward the front end of compactor apparatus 14, that is, toward front cross member 40 at the top of FIG. 15. Depending on the angle or pitch of helical flights 96 of auger 90 relative to the longitudinal direction, when rotated in direction D, auger 90 will have a tendency to push the cotton therebeneath, at least to some extent, to the left as viewed from above. Simultaneously, right hand auger 88 will be rotated in the counterclockwise direction E so as to convey or push cotton therebeneath toward the front and, at least to some extent, to the right, depending on the pitch or angle of right hand helical flight 98. In this way, it should be apparent that by the combination of left hand augers flights 96 on auger 88, right hand auger flights 98 on auger 90, and counter-rotating those opposite hand augers in directions D and E, respectively, collected cotton beneath compactor apparatus 14 can be conveyed thereby to a central, front region of compacting chamber 22, as generally denoted by region 108 in FIG. 13, and as is advantageous as discussed above for forming a module having a crown. Again, this can be done at any position in chamber 22.

FIG. 16 is a diagrammatic representation of a matrix of possible directions of rotation of augers 88 and 90 of the embodiment of FIG. 15, denoted as A and B, respectively. Again, arrow D or E in each of the boxes denotes the direction of rotation of the auger, and the diagonal arrow in the box below the arrow D or E denotes the direction in which the cotton beneath the auger will be conveyed thereby. Thus, it can be seen that simultaneous counter-rotation of augers A and B in directions E and D, respectively, will result in conveyance of cotton therebeneath generally toward the center and front, that is, toward region 108, whereas counter-rotation of those augers in the opposite directions, D and E, respectively, will convey the cotton therebeneath more outwardly and rearwardly. The boxes for conveyance of the cotton more forwardly are connected by solid line 110. The boxes for conveyance of the cotton more rearwardly are connected by dotted line 112. Again, it is anticipated that the operating combination of line 110 would be mostly used for forming a module having a crown top.

Figure 17:
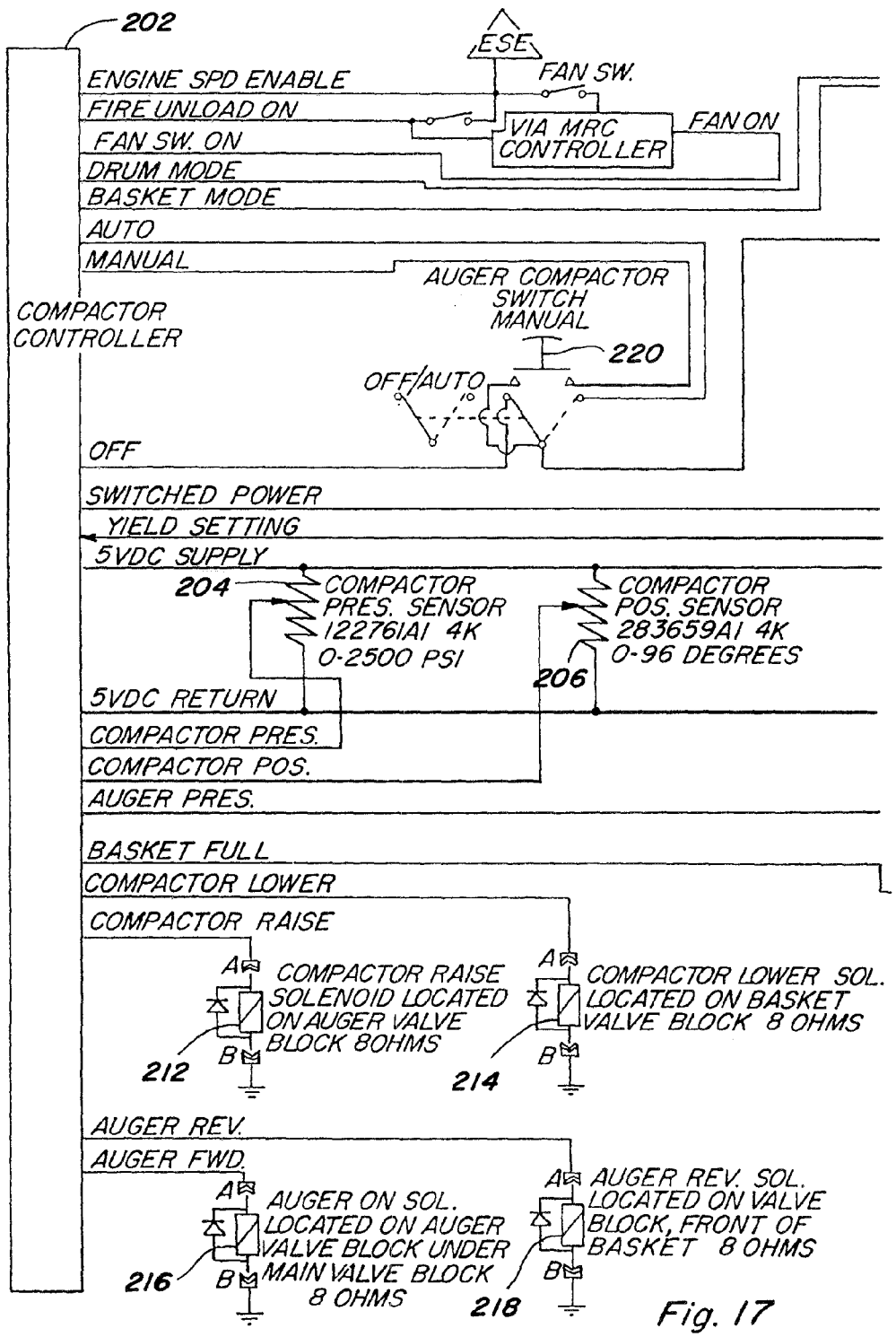
FIG. 17 is a schematic diagram of a representative compactor control for use with the invention.
Figure 17A:
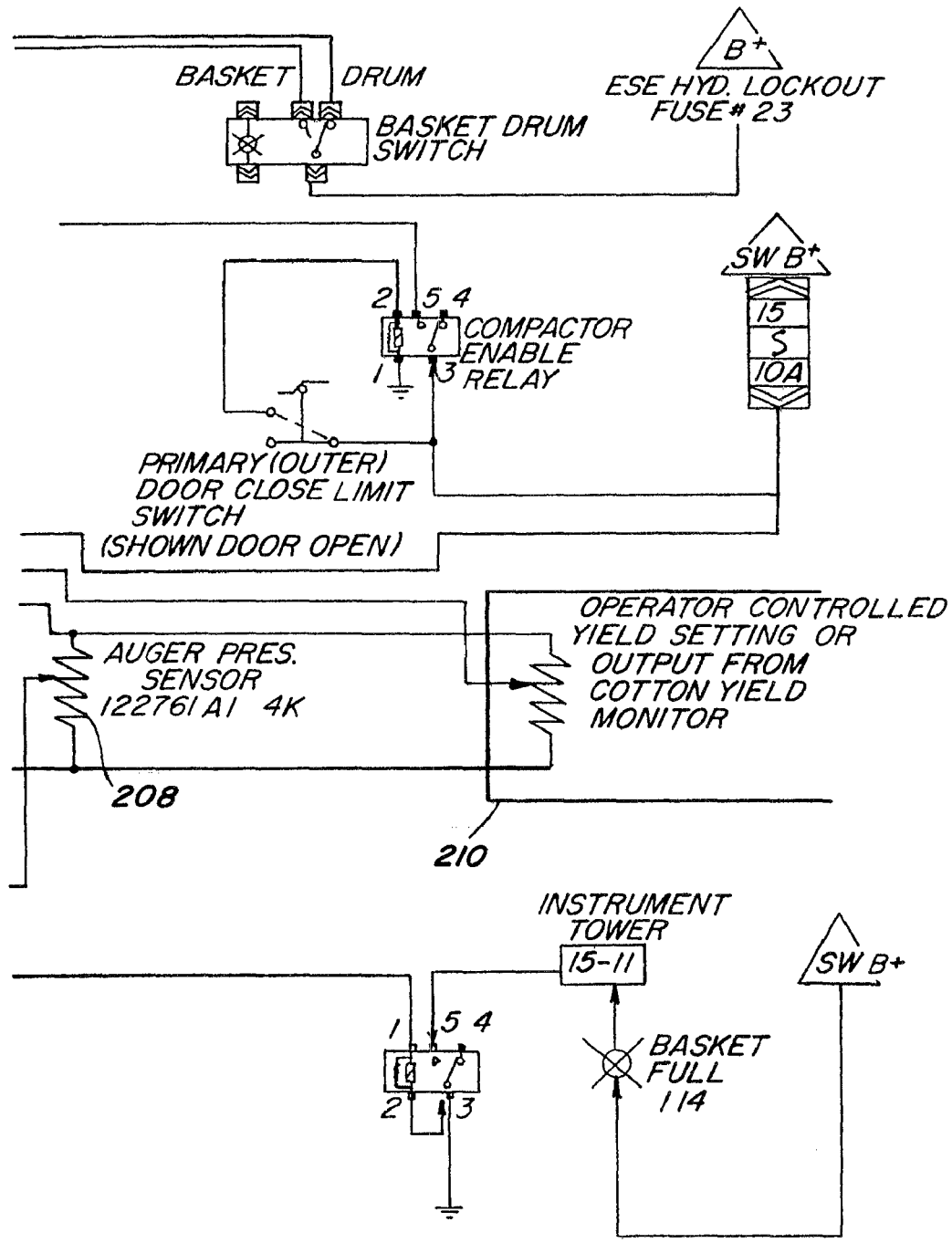
FIG. 17a is a continuation of the diagram of FIG. 17.
Figure 18:
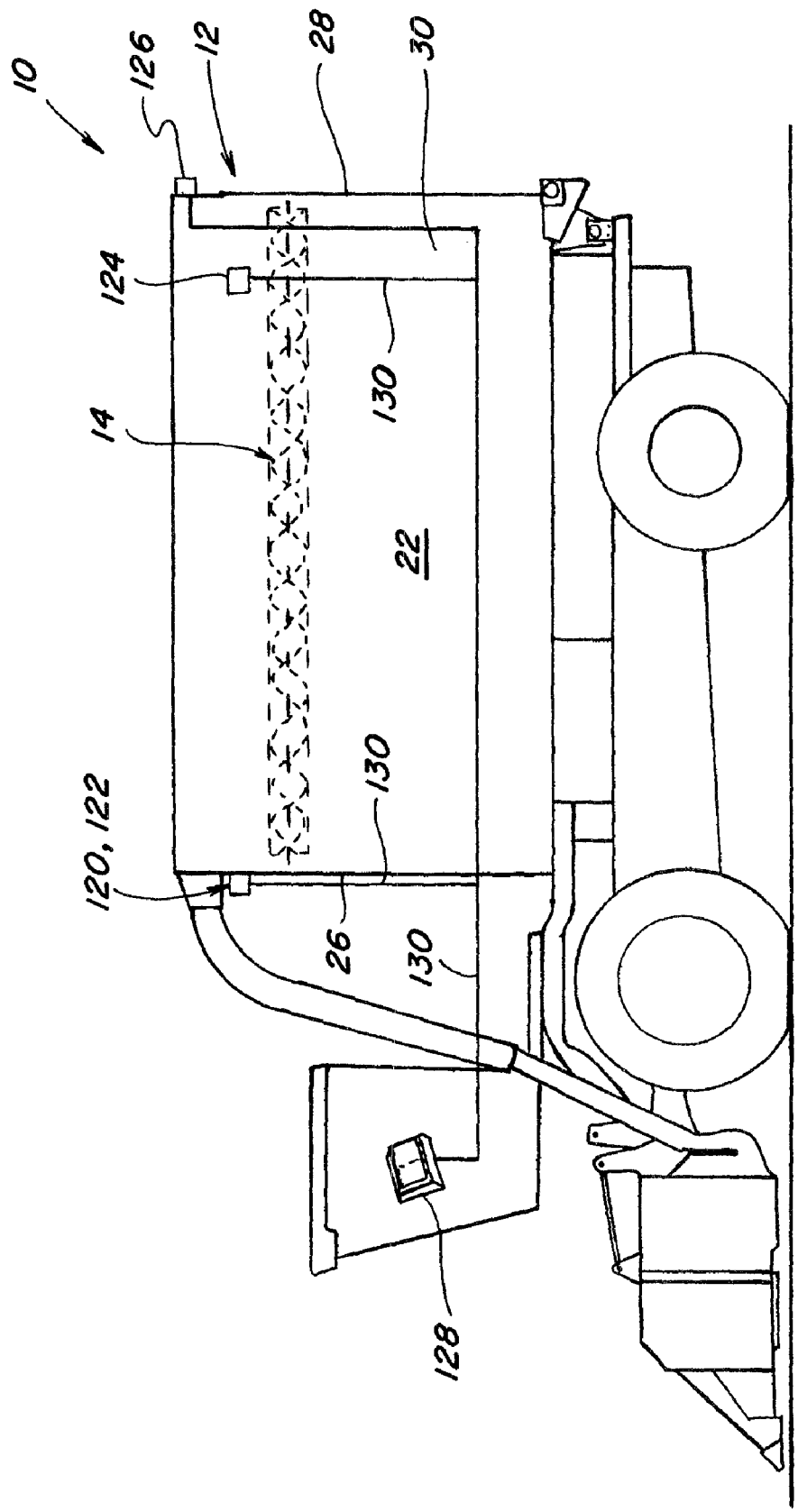
FIG. 18 is a simplified schematic side view of the harvesting machine of FIG. 1, illustrating aspects of the invention, including cameras at representative locations on and in the module builder.

Referring also to FIGS. 17 and 17a, circuitry of a representative compactor control 200 usable with the system and method of the present invention, is shown. Control 200, and its operation, are discussed in greater detail in Covington et al., U.S. Pat. No. 7,275,357, issued Oct. 2, 2007, and entitled Cotton Module Program Control Using Yield Monitor System, the disclosure of which patent is hereby incorporated herein by reference in its entirety. Briefly, control 200 includes a compactor controller 202 automatically operable for receiving signals outputted by a number of devices, including, but not limited to, a compactor pressure signal from a compactor pressure sensor 204, a compactor position signal outputted by a compactor position sensor 206, an auger pressure signal outputted by an auger pressure sensor 208, and a yield signal outputted by an operator controlled yield setting or a cotton yield monitor 210. Responsive to the signals from these devices, and/or other devices, controller 202 is operable for automatically outputting signals to apparatus including a compactor raise solenoid 212 and a compactor lower solenoid 214, which control compactor drivers, such as drivers 52 of module builder 12 (FIG. 1) operable for moving compactor apparatus 14 of module builder 12 upwardly and downwardly against cotton accumulated in a bottom region of compactor chamber 22 of module builder 12. Compactor control 200 is also operable for outputting signals to the augers of compactor apparatus 14, for effecting forward or reverse rotation thereof via an auger on solenoid 216 and an auger reverse solenoid 218. Still further, control 200 includes an auger compactor switch 220 operable by an operator for initiating manual or automatic operation of the compactor.

As an operational example, controller 202 can be programmed to automatically execute a module building routine including a sequence of steps, which steps will include cotton distributing steps wherein the augers are operated in one direction or the other for distributing the cotton in a desired manner, and compacting steps wherein drivers 52 are operated for compacting the cotton into the module being built. Such routine will typically be executed during harvesting operations. In an automatic module building routine, the distributing steps and compacting steps will typically be alternated or executed in a predetermined sequence. Parameters of the distributing steps, such as, but not limited to, the duration of operation and/or direction of rotation of the augers during the distributing steps can be predetermined, or can vary, for instance, as a function of signal inputs from, for instance, compactor pressure sensor 204, compactor position sensor 206, auger pressure sensor 208, and/or yield monitor 210. Parameters of the compacting steps, such as, but not limited to, duration, extent or degree of compaction and/or and pressure exerted, can also be predetermined, or can vary, as a function of the signal inputs. The program can also include automatic indexing steps wherein the height of the raised non-compacting positions of drivers 52 are gradually raised, corresponding to the increasing height of the module as it is being built, to thereby shorten the compactor stroke.

As a result of any of a variety of factors that can change during a harvesting operation, including, but not limited to, crop yields, moisture content, cotton variety, and others discussed above, even when using a yield monitor, position, pressure, and other sensor inputs, module parameters such as, but not limited to, consistency and top shape, can vary when using an automatic routine. As a result, it is desirable to have a capability to alter or modify parameters of the routine, supplement, and/or to add steps, as required or desired for achieving a desired module build quality, particularly, top shape and evenness.

Referring also to FIGS. 18, 19, 20, 21, 22, 23, 24, 25, 26 and 27, module builder 12 of harvesting machine 10 is illustrated including imaging apparatus 120 of the invention, operable for providing real-time visual images of conditions within compacting chamber 22 of the module builder, including, but not limited to: at least an approximation of the existing shape of a module being built; cotton inflow and distribution characteristics, including, but not limited to, approximate inflow rates and approximate cotton accumulation on or above compactor apparatus 14; amount of trash present; condition of the cotton; approximate flow rates of cotton through different regions of compactor apparatus 14; and elevation of accumulated cotton in various locations below compactor apparatus 14, including from different perspectives, as well as to observe operation of compactor 14 and the augers thereof.

Preferably, imaging system 120 includes at least one video camera, which can include, but is not limited to, a forward camera 122, a side or rear camera 124, and an external rearwardly directed camera 126. Cameras 122, 124 and 126 can have wide angle, telephoto, and/or zoom or auto-focus capabilities, high-definition, low light functionality, and other well-known capabilities found in commercially available cameras, as desired or required for providing the images sought. Forward camera 122 is preferably mounted on or adjacent front end wall 26 of module builder 12. Rear camera 124 can be mounted on or adjacent a side wall 30, preferably near rear end wall 28, or on or adjacent wall 28, as most advantageous for a particular module builder set up.

Cameras 122, 124 and 126 are preferably connected to at least a display device 128 via one or more conductive paths 130, which can include, but are not limited to, wires of a wiring harness, or a wired or wireless communications network, as desired. Display device 128 is illustrated as being located in an operator cab on harvesting machine 10, but it is also contemplated that display device 128, or an additional display device connected to the system for receiving images, may be located elsewhere, such as a remote location, for use by an operator at that location. In either instance, display device 128 enables an operator to view the conditions and activities within module builder 12 in real-time, particularly, to evaluate or determine the size, shape and condition, of the cotton module being built, as well as build-ups or accumulations of cotton thereon, and make appropriate or desired modifications to an automatic module building routine executed by controller 202, including, but not limited to, to alter or modify parameters of the routine, supplement, and/or to add steps, as required or desired for achieving a desired module build quality, particularly, top shape and evenness. The images can also be utilized for building a module solely by manual control of operation of compactor 14, if desired. Further, system 120 and display device 128 are configured to provide the capability to display split images (FIG. 20) from one or more of the cameras, which can be particularly useful for aiding an operator in ascertaining the elevational distribution of loose cotton 114 at desired locations within chamber 22, both above compactor apparatus 14, and on a partial or complete cotton module 62 therebelow.

Imaging system 120 can also include one or more optional lights 132 (FIG. 19) can be provided for illuminating desired regions of chamber 22, to facilitate image quality under low natural light conditions. An additional light or lights can also be provided externally in association with camera 126, as desired.

As examples of the capabilities that can be achieved according to the invention, the direction and duration of rotation of the augers for one or more cotton distributing steps of the routine, as well as parameters of compacting steps of the routine can be modified, enhanced, and/or eliminated, as desired or required.

Figure 19:
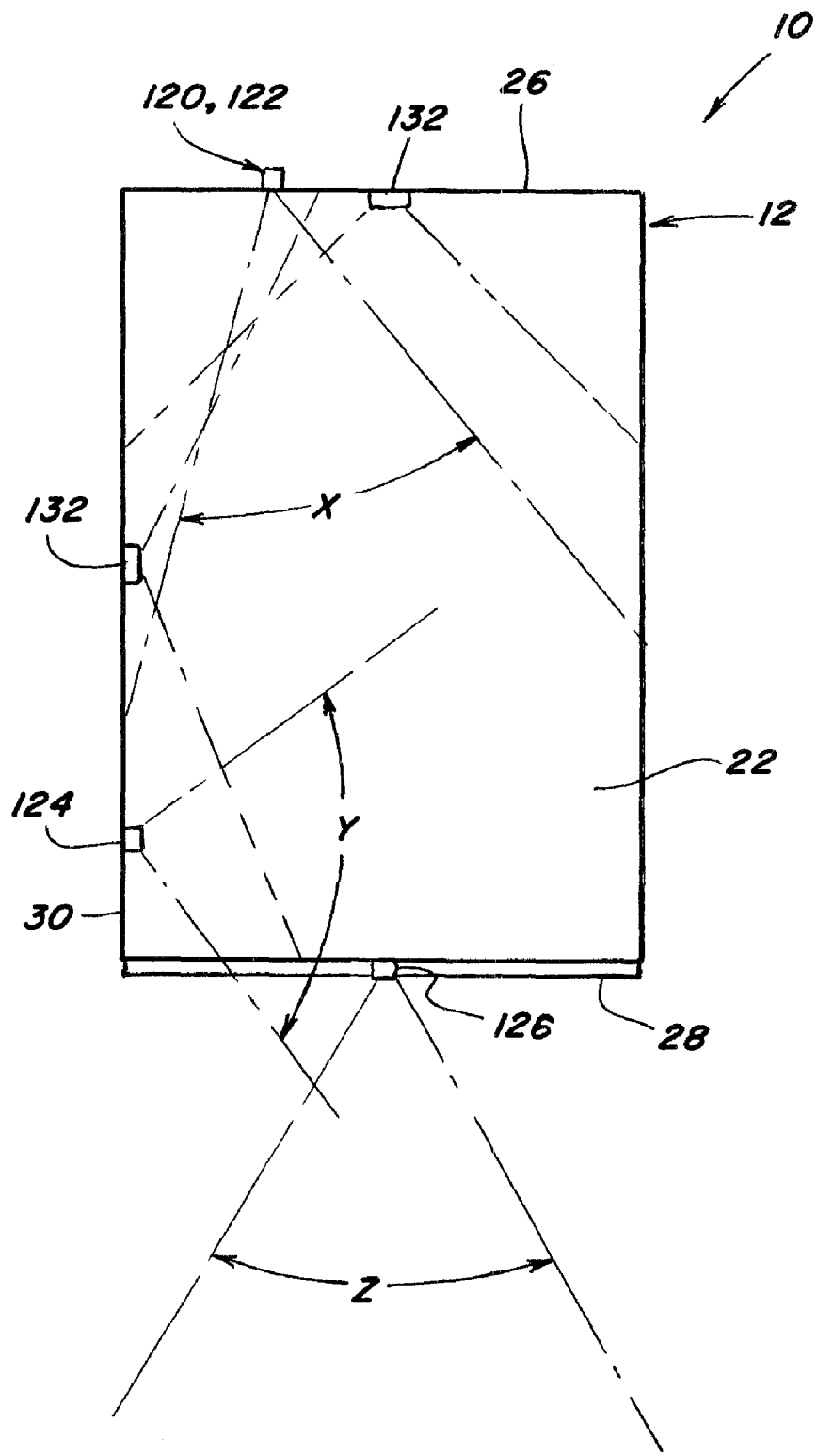
FIG. 19 is a simplified schematic top view of the module builder, illustrating aspects of the invention, including cameras at representative locations, projections of fields of view thereof, and lights.
Figure 20:
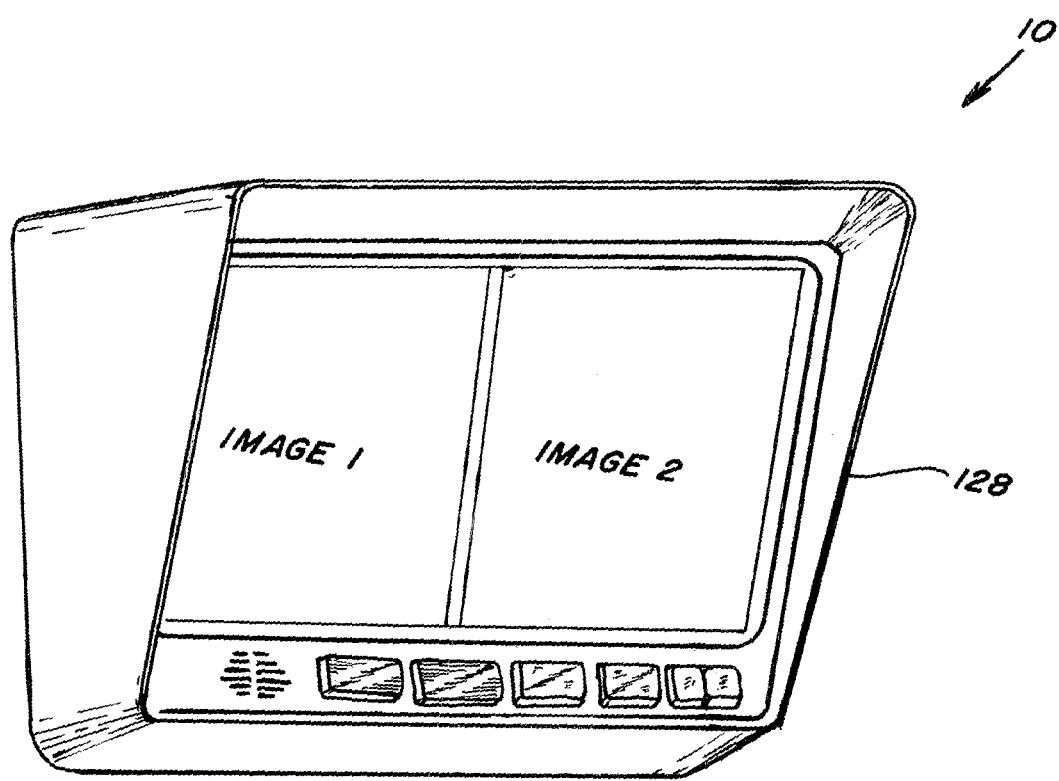
FIG. 20 is a perspective view of a representative display device for the invention.

Referring in particular to FIG. 19, a top view of chamber 22 of module builder 12 is shown, forward camera 122 up of system 120 having an approximate field of view X, camera 124 having an approximate field of view Y, and camera 128 having an approximate field of view Z. Here, it should be noted that fields of view X, Y and Z shown are not to be interpreted as limiting, and can vary widely, as desired or required for a particular application. It can be noted that field of view X is a rearwardly directed view which will encompass a wide swath of at least most of the rear of chamber 22, so as to provide a forward perspective of that area; field of view Y will overlap a portion of field of view X, and provide a side perspective of the area. This is desirable according to the objects of the present invention, as the different perspectives can be used to facilitates the ability to determine elevational extent of cotton accumulated in chamber 22, which is naturally difficult, as a result of the generally monochromatic nature of cotton, and lack of inherent contrast, and the fast moving, often swirling airborne loose cotton, filaments, trash and dust, that are present.

Figure 26:
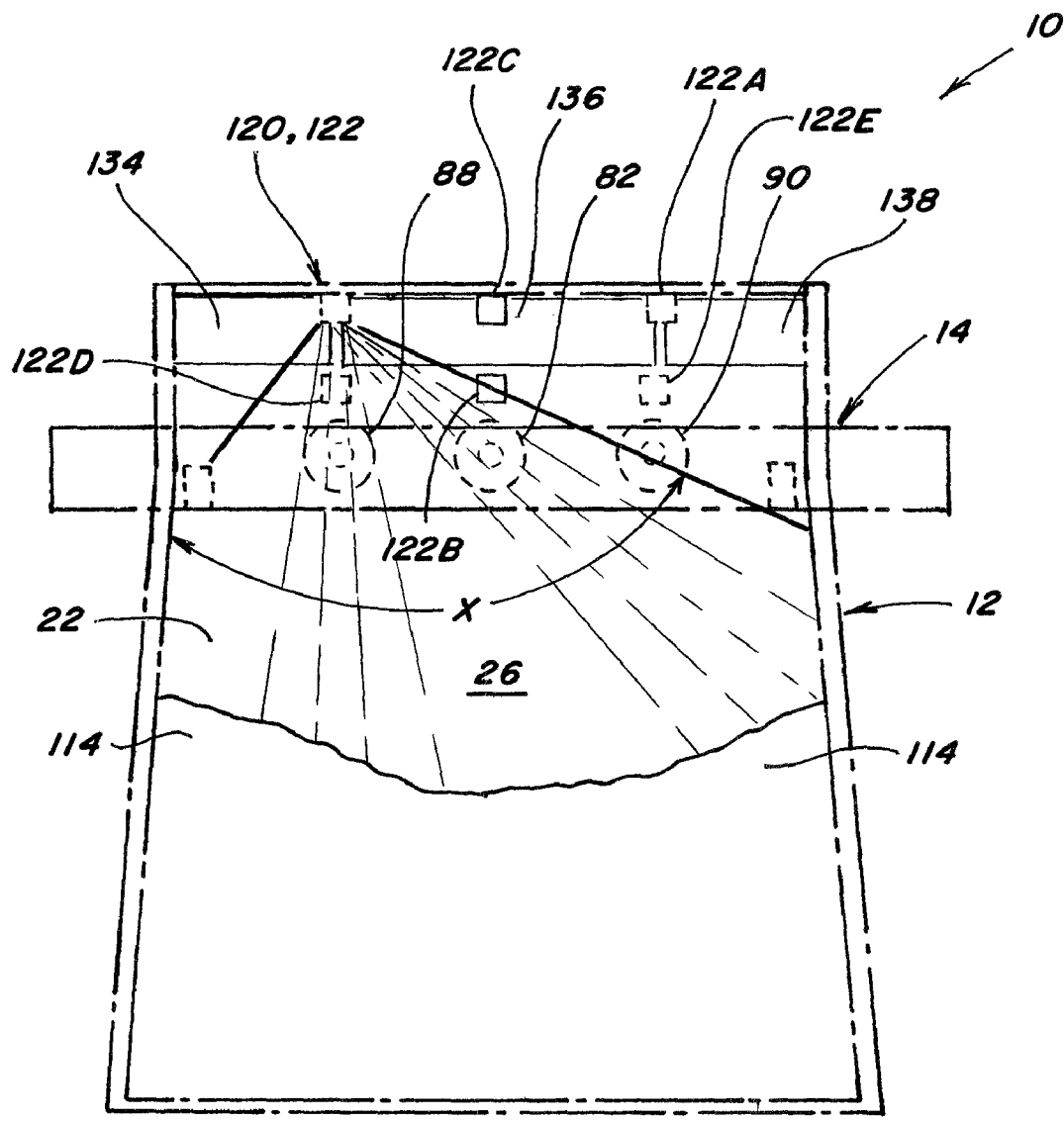
FIG. 26 is a simplified schematic end view of the module builder, illustrating possible camera locations, and accumulated cotton distributed more toward the sides of the module builder.
Figure 27:
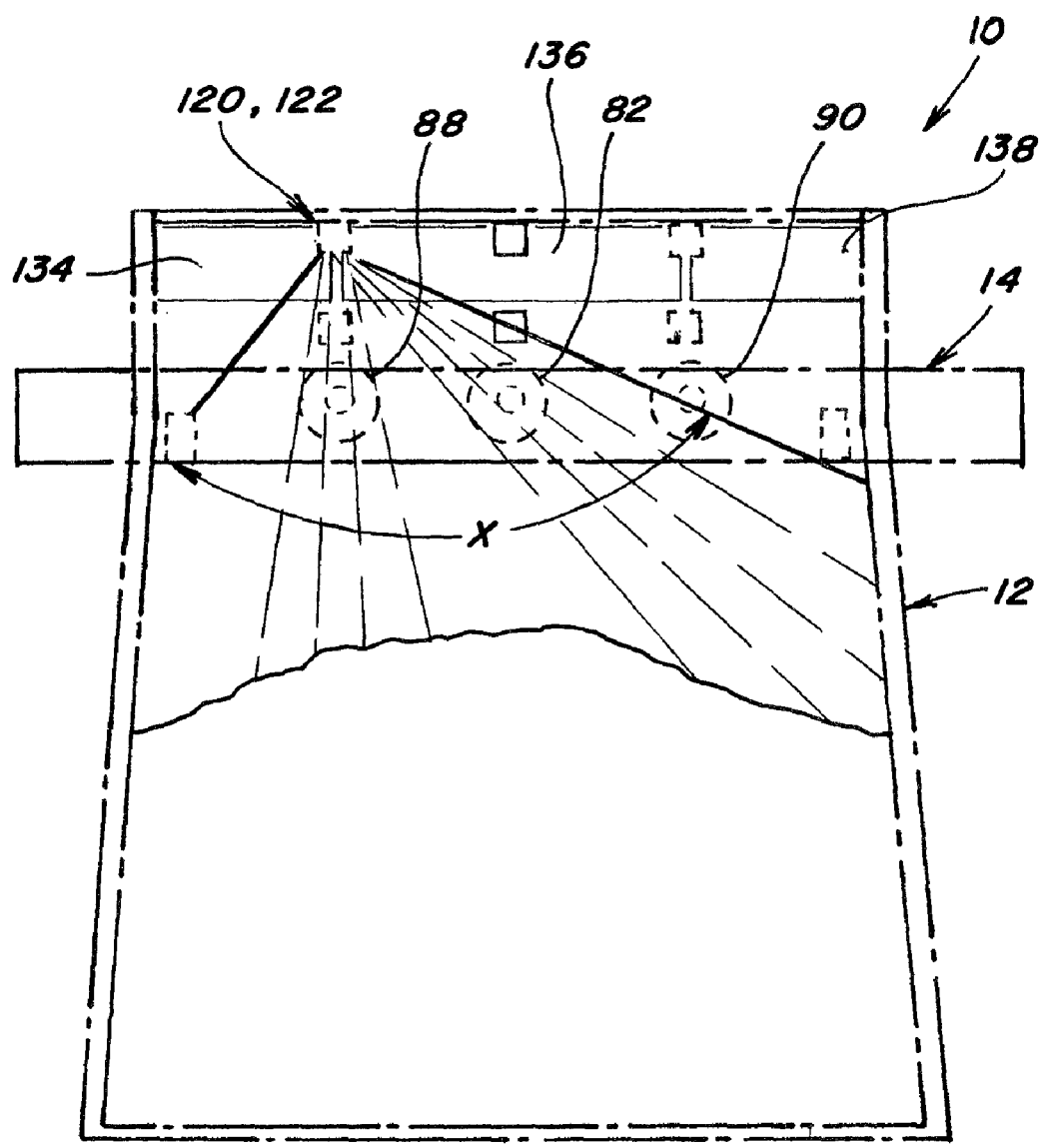
FIG. 27 is another simplified schematic end view of the module builder, illustrating cotton accumulated more toward the center.

Additionally, as best illustrated in FIGS. 26 and 27, the cameras are preferably located above compactor apparatus 14, and forward camera 122 is preferably located to one side or the other of the center of the wall 26, so as to give an angled perspective, and so as to be out of direct flow of incoming loose cotton through inlet openings 134, 136 and 138. Here a preferred location is between inlet openings 134 and 136, or between inlet openings 136 and 138 (illustrated by forward camera 122A), but other locations can be used, such as illustrated by cameras 122B, 122C, 122D and 122E. Regardless of the location selected, compactor apparatus 14 is likely to block portions of the field or fields of view of the camera or cameras, e.g., dotted lines in field of view X of camera 122, such that small swaths of the accumulated loose cotton 114 and also the top of the module will be blocked from view, but the locations of cameras 122 and 122A are preferred for the present application as this blockage is minimized so as to be inconsequential. Recall here that the loose harvested cotton enters the upper region of chamber 22 from inlet openings 134, 136 and 138 at the top of front end wall 26, and is distributed into the lower region of chamber 22 by the operation of the augers of compactor apparatus 14 during the cotton distributing steps, but that the cotton has a tendency to accumulate more in the rear region of chamber 22, due to the rearward flow, such that that area is typically more subject to build-up of loose cotton and is thus of particular interest. FIGS. 26 and 27 are noteworthy also as they shows more accumulated cotton toward the sides of chamber 22 (typically less desired), and more toward the center (more desired), respectively.

Figure 22:
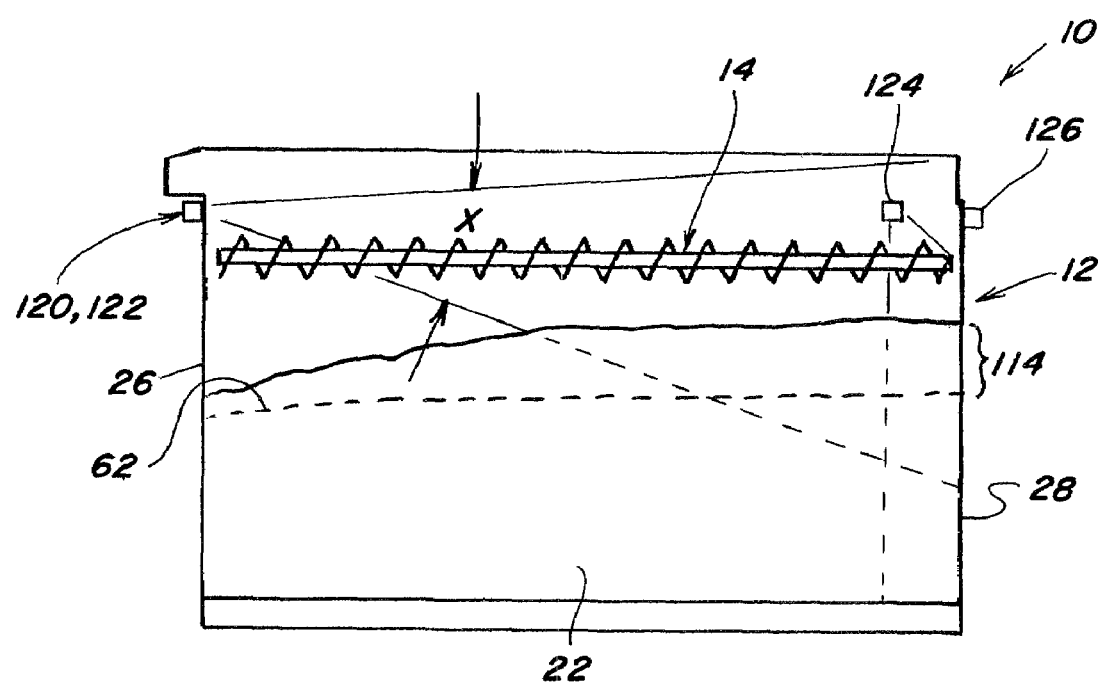
FIG. 22 is a simplified schematic side view of the module builder, illustrating a representative topography of cotton accumulated on a partially completed cotton module therein, which accumulated cotton is greater toward the rear end.
Figure 23:
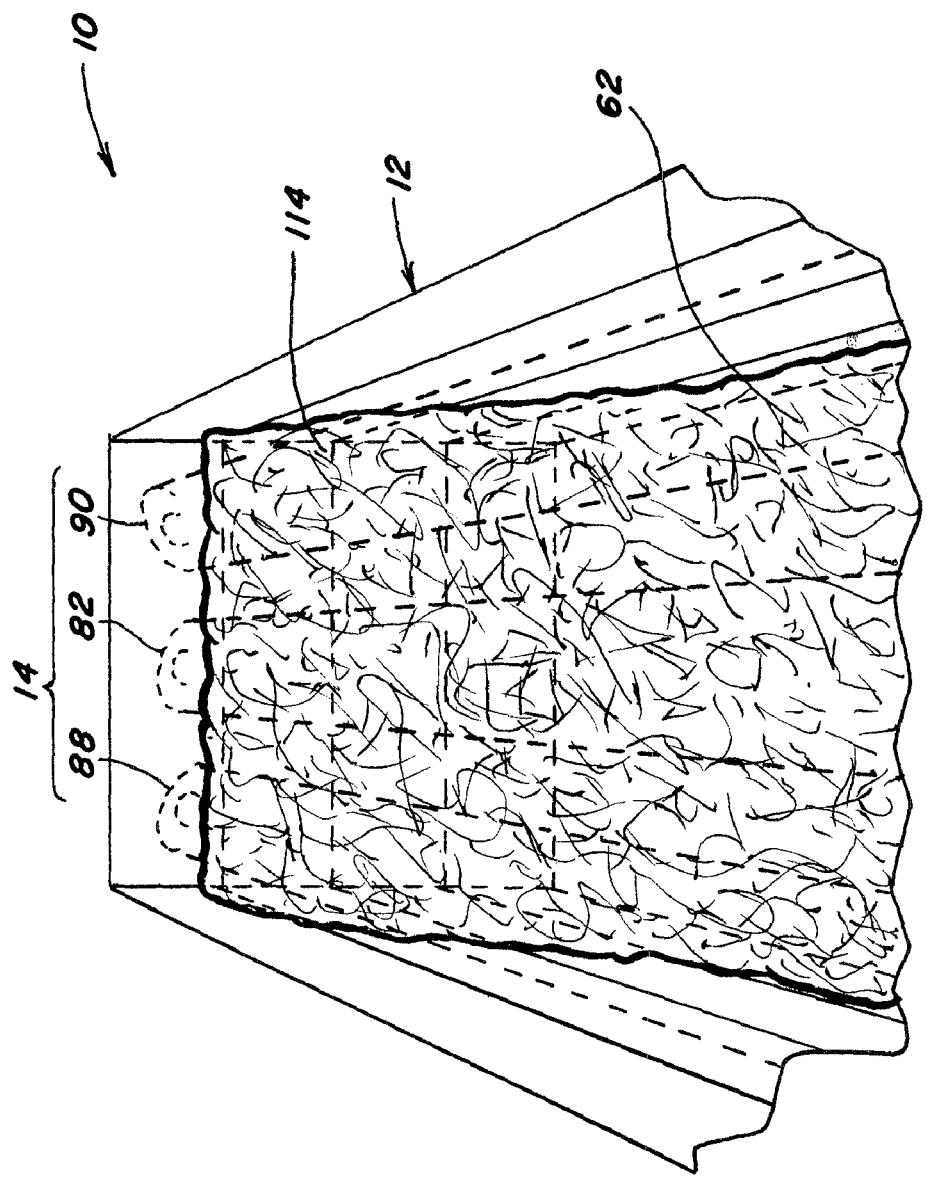
FIG. 23 is a simplified schematic end view of the module builder of FIG. 22, illustrating a representative visual image of the accumulated cotton.

FIGS. 22 and 23 illustrate accumulation of loose cotton 114 on a partially built module 62 more toward the rear of chamber 22, as will be largely in field of view X of camera 122. Here, the elevational extent of the loose cotton can be determined from the extent of coverage on and contrast with the side walls of the chamber, looking though (between the flights) of respective augers 88 and 90 (illustrated in dotted lines) of compacting apparatus 14.

Figure 24:
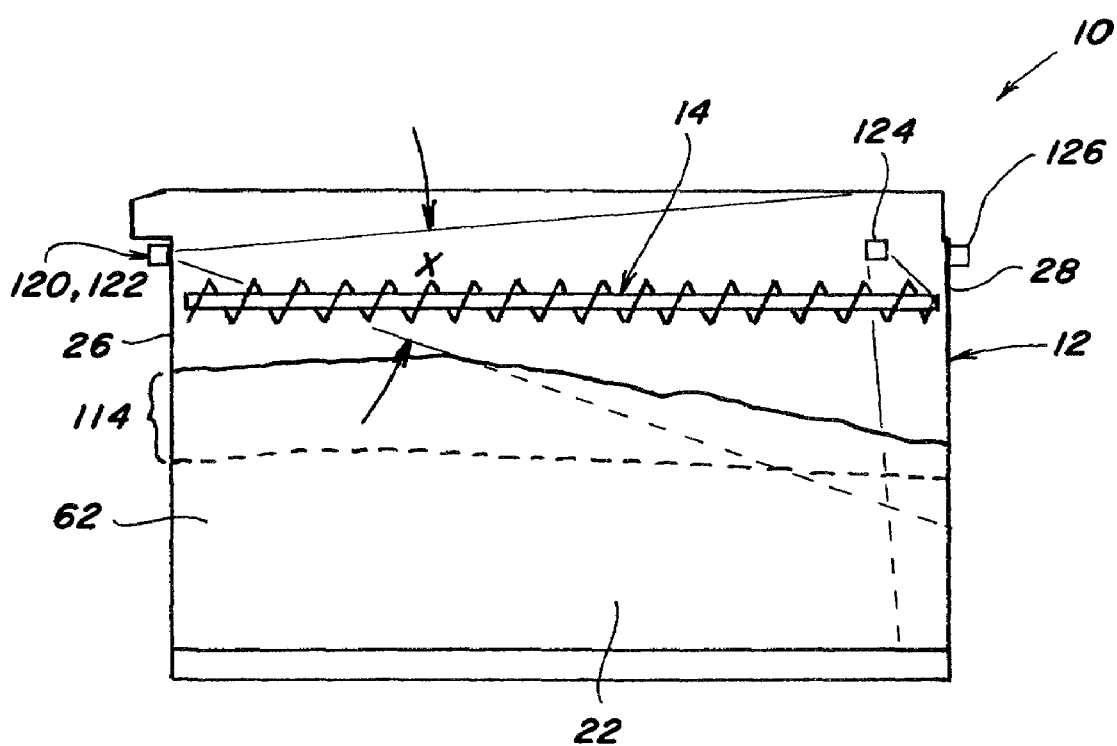
FIG. 24 is another simplified schematic side view of the module builder, illustrating a representative topography of cotton accumulated on a partially completed cotton module therein, which accumulated cotton is greater toward the front.
Figure 25:
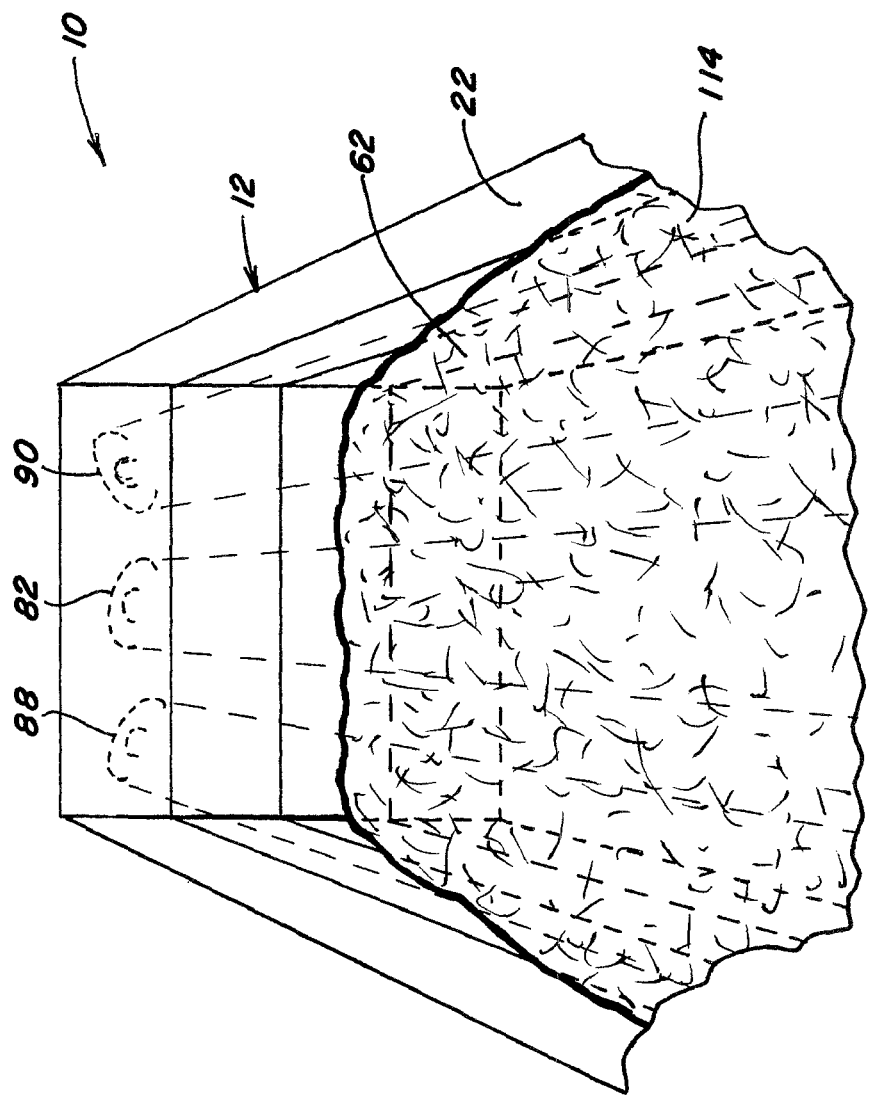
FIG. 25 is a simplified schematic end view of the module builder of FIG. 24, illustrating a representative visual image of the accumulated cotton.

FIGS. 24 and 25 illustrate accumulation of loose cotton 114 on a partially built module 62 more toward the forward end of chamber 22, as will be largely in field of view X of camera 122. In FIG. 25, augers 88 and 90 are again illustrated in dotted lines to denote their location.

As explained above, by viewing the images of the conditions in chamber 22, particularly during execution of an automatic module building routine, an operator can determine if the module building is proceeding satisfactorily, or if a corrective or supplemental steps are required as a result of any of a variety of circumstances. Again, examples of the steps that can be taken can include altering the direction and/or duration of rotation of the augers for one or more cotton distributing steps of the routine, adding or subtracting cotton distributing steps, as well as altering, adding, or eliminating parameters of compacting steps of the routine. Here, it should be recalled that the augers can be rotated in one direction to distribute cotton more toward one end and the center of the chamber, and in an opposite direction to distribute it more outwardly toward the side. As a result, by observing the images captured of conditions in chamber 22, the status and location, elevation, etc., of accumulated cotton can be accurately ascertained, and steps taken for achieving a variety of goals, e.g., move cotton more toward the center to increase a crown or taper, more toward the sides to decrease it, and more toward one end or the other, in the manner described above, according to the teachings of the invention. And, more or less compaction can be preformed to achieve a desired density, e.g., firmness.

Figure 21:
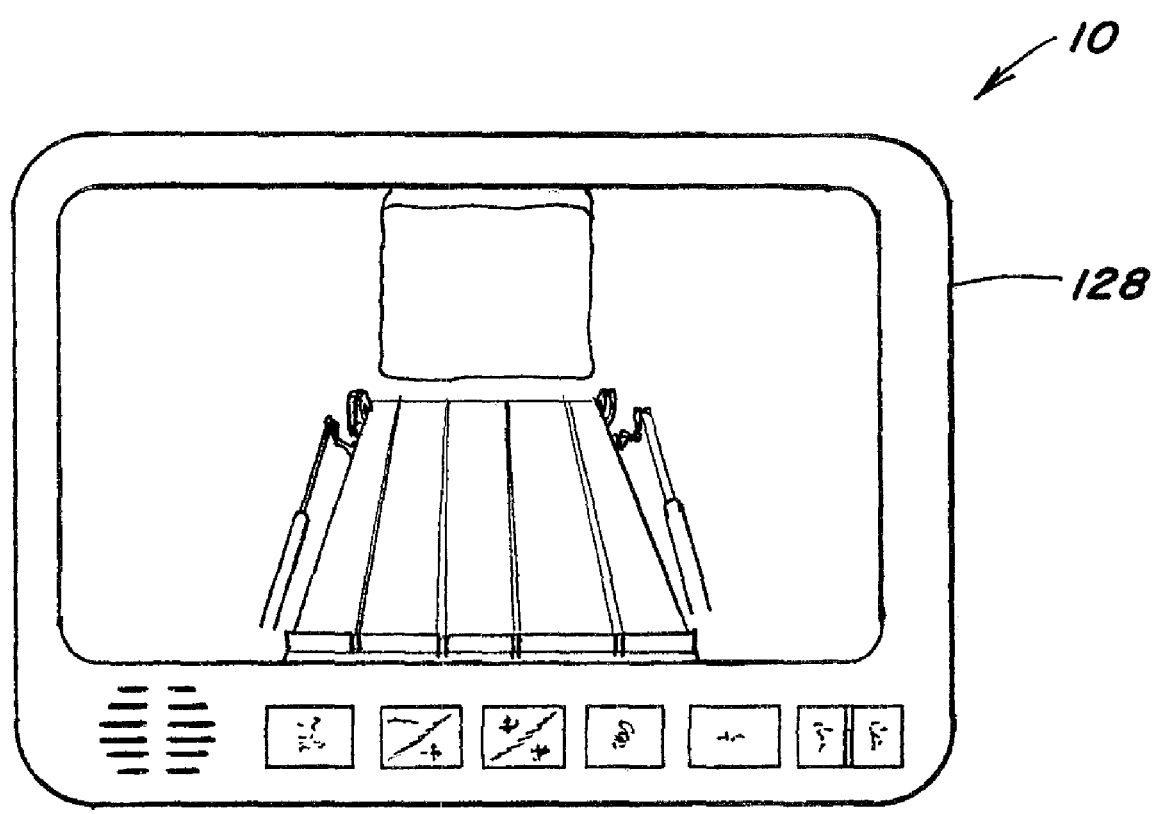
FIG. 21 is a front view of the display device.

Briefly referring in particular to FIG. 21, it can be seen from the illustrated image that images captured by an external imaging device such as camera 126 have utility for use in maneuvering machine 10 and operating door 116 for unloading a module, for instance, into abutting relation to an existing module on the ground.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A cotton module builder, comprising:
   structure enclosing and defining a compacting chamber;
   a compactor frame supported in an upper region of the chamber by at least one compactor driver for downward movement in the chamber for compacting cotton accumulated in a lower region of the chamber, the frame supporting at least one auger operable at least in a first operating mode for moving cotton in contact therewith in a first direction in the chamber and in a second operating mode for moving cotton in contact therewith in a second direction in the chamber, the second direction is opposite from the first direction,
   at least one imaging device comprises a video camera disposed on the structure and configured for capturing an image of the chamber, including an image of at least an elevation of accumulated cotton in at least one location within the chamber to enable determining an appropriate one of the operating modes for distributing the cotton to achieve a desired elevational distribution of cotton in the chamber; and
   a controller in operative control of the at least one auger, the controller being operable responsive to the determination of the appropriate one of the operating modes, for controllably operating the at least one auger for moving the cotton to achieve the desired elevational distribution in responsive to the captured image.

2. The cotton module builder of claim 1, further comprising a display device connected to the imaging device and operable for displaying the captured image for viewing by an operator.

3. The cotton module builder of claim 2, wherein the module builder is located on a self-propelled cotton harvesting machine, and the display device is located in an operator cab of the machine.

4. The cotton module builder of claim 1, wherein the video camera mounted at a forward, elevated location adjacent to or within the chamber, such that the captured image of the elevation of the accumulated cotton will be from a forward perspective.

5. The cotton module builder of claim 4, wherein the at least one imaging device comprises a second video camera mounted at a rear, elevated location adjacent to or within the chamber, for providing an additional captured image of the elevation of the accumulated cotton from a rear perspective.

6. The cotton module builder of claim 4, wherein the at least one imaging device comprises a third video camera mounted at an external location on the structure in a position for capturing images of unloading apparatus of the module builder.

7. The cotton module builder of claim 1, wherein a plurality of the imaging devices are provided at different locations for capturing images of the elevation of the accumulated cotton from a plurality of perspectives.

8. The cotton module builder of claim 4, wherein the video camera is configured and positioned for capturing at least one image showing a position of the compactor frame while compacting the cotton.

9. The cotton module builder of claim 1, further comprising at least one light operable for illuminating the captured image of the chamber.

10. The cotton module builder of claim 1, wherein the first direction is toward a center and one end of the chamber, and the second direction is toward opposite sides and another end of the chamber.

11. A method of operation of a cotton compactor of a cotton module builder, comprising steps of:
    providing a cotton module builder having a module building chamber having one end including an inlet through which loose cotton will enter the chamber, and an opposite end;
    providing a compactor including a compactor frame supported in an upper region of the module building chamber of the module builder by at least one driver controllably operable for moving the frame downwardly against cotton accumulated in a lower region of the chamber and upward movement therefrom, the compactor frame supporting at least one auger controllably rotatable in a first direction for moving accumulated cotton in contact therewith toward one of the ends and toward a center of the chamber, and in a second direction for moving the accumulated cotton in contact therewith toward another of the ends and toward sides of the chamber the second direction is opposite from the first direction;
    providing a controller connected in operative control of the at least one auger and the at least one driver, the controller being programmed and operable for executing an automatic module building routine including steps including controlling the at least one auger for distributing the cotton, and steps including controlling the at least one driver for compacting the accumulated cotton into a compacted cotton module;
    providing at least one imaging device comprises a video camera on the module builder configured and operable for capturing an image showing distribution of the accumulated cotton in the chamber; and
    responsive to the captured image, performing at least one step in responsive to the captured image, the at least one step is selected from a group consisting of:
    a. controlling the at least one auger for distributing the cotton more toward the center of the chamber;
    b. controlling the at least one auger for distributing the cotton more toward the sides of the chamber.

12. The method of claim 11, wherein the step of providing the at least one imaging device further comprises providing a display device connected to the imaging device, and an operator viewing the captured image on the display device and inputting a command or commands to the controller for performing the at least one step responsive to the captured image.

13. The method of claim 12, wherein the module builder is located on a self-propelled cotton harvesting machine, and the display device and the operator are located in an operator cab of the machine.

14. The method of claim 11, wherein the a video camera mounted at a forward, elevated location within or adjacent to the chamber such that the captured image will be from a forward perspective.

15. The method of claim 14, wherein the at least one imaging device comprises a second video camera mounted at a rear, elevated location within or adjacent to the chamber, for capturing images of the accumulated cotton from a rear perspective.

16. The method of claim 14, wherein the at least one imaging device comprises a third video camera mounted at an external location on the structure in a position for capturing images of unloading apparatus of the module builder.

17. The method of claim 14, wherein the video camera is configured and positioned for capturing the image of the elevation of accumulated cotton and also the compactor frame when compacting the cotton.

18. The method of claim 14, wherein the at least one imaging device comprises a second video camera mounted at a side, elevated location within or adjacent to the chamber, for capturing images of the accumulated cotton from a side perspective.

19. The method of claim 11, further comprising at least one light operable for illuminating the captured image.

20. Apparatus for distributing and compacting cotton for forming a compacted cotton module, comprising:

a frame supported by at least one driver in a compactor chamber of a cotton packager, the driver being controllably operable for moving the frame downwardly in a compacting movement against cotton collected in a bottom portion of the chamber, the frame including elongate side compactor members extending along opposite sides of the chamber, respectively, the side compactor members defining a space therebetween and including lower portions adjacent to the opposite sides of the chamber, respectively, for pressing against any cotton located therebelow during the downward compacting movement for compacting cotton to form peripheral edges of a top surface of a cotton module, and the frame supporting a plurality of elongate augers extending through the space, the augers including at least one right hand auger located adjacent to one of the side compactor members and having at least one right hand helical flight extending longitudinally therearound, and at least one left hand auger located adjacent to another of the side compactor members and having at least one left hand helical flight extending longitudinally therearound, the right and left hand augers being simultaneously counter-rotatable in a first manner for moving cotton longitudinally along and through the frame in directions converging toward a center region of the chamber, and the right and left hand augers being simultaneously counter-rotatable in a second manner for moving cotton longitudinally along and through the frame in directions diverging from the center region of the chamber;

a controller connected in operative control of the augers and the at least one driver, the controller being programmed and operable for executing an automatic module building routine including steps including controlling the augers for distributing the cotton, and steps including controlling the at least one driver for compacting the cotton into a compacted cotton module;

at least one imaging device comprises a video camera disposed on the cotton packager configured and operable for capturing an image showing distribution of the cotton on the compacted module in the compactor chamber; and the controller being operable by an operator responsive to the captured image for controllably operating the augers for moving the cotton toward the center of the module or away from the center of the module in responsive to the captured image.

21. Apparatus of claim 20, further comprising a display device connected to the imaging device and operable for displaying the captured image for viewing by the operator.

22. Apparatus of claim 21, wherein the packager is located on a self-propelled cotton harvesting machine, and the display device is located in an operator cab of the machine.

23. Apparatus of claim 20, wherein the video camera mounted at a forward, elevated location within or adjacent to the chamber, such that the captured image will be from a forward perspective.

24. Apparatus of claim 23, wherein the at least one imaging device comprises a second video camera mounted at a rear, elevated location within or adjacent to the chamber, such that the captured image will include an image from a rear perspective.

25. Apparatus of claim 23, wherein the at least one imaging device comprises a third video camera mounted at an external location on the packager in a position for capturing images of unloading apparatus thereon.

26. Apparatus of claim 23, wherein the video camera is configured and positioned for capturing the image of the elevation of accumulated cotton through the compactor frame.

27. Apparatus of claim 23, wherein the video camera is configured and positioned for capturing at least one image showing a position of the compactor frame while compacting the cotton.

28. Apparatus of claim 20, further comprising at least one light operable for illuminating the captured image of the chamber.

* * * * *